US006208963B1

(12) United States Patent
Martinez et al.

(10) Patent No.: US 6,208,963 B1
(45) Date of Patent: Mar. 27, 2001

(54) METHOD AND APPARATUS FOR SIGNAL CLASSIFICATION USING A MULTILAYER NETWORK

(76) Inventors: Tony R. Martinez, 817 S. 300 W., Orem, UT (US) 84058; R. Brian Moncur, 1375 N. 90 E., Orem, UT (US) 84057; D. Lynn Shepherd, 961 E. 70 S.; Randall J. Parr, 73 S. 630 E., both of Lindon, UT (US) 84042; D. Randall Wilson, 12675 Martinez Way, Riverton, UT (US) 84065; Carl Hal Hansen, 494 W. 870 S., Orem, UT (US) 84058

( * ) Notice: Subject to any disclaimer, the term of this patent is extended or adjusted under 35 U.S.C. 154(b) by 0 days.

(21) Appl. No.: 09/103,569

(22) Filed: Jun. 24, 1998

(51) Int. Cl.$^7$ .................................................. G10L 15/16

(52) U.S. Cl. ........................................ 704/232; 704/270

(58) Field of Search .................................... 704/232, 270

(56) References Cited

U.S. PATENT DOCUMENTS

| | | | |
|---|---|---|---|
| 4,660,166 | 4/1987 | Hopfield | 708/801 |
| 4,719,591 | 1/1988 | Hopfield et al. | 708/801 |
| 4,937,872 | 6/1990 | Hopfield et al. | 704/232 |
| 5,175,794 | * 12/1992 | Tattersall | 704/200 |
| 5,311,421 | * 5/1994 | Nomura et al. | 700/37 |
| 5,377,302 | * 12/1994 | Tsiang | 700/235 |

FOREIGN PATENT DOCUMENTS 8-106448    4/1996   (JP) .

OTHER PUBLICATIONS

Andrew Noetzel, "Robust Syllable Segmentation of Continuous Speech Using Neural Networks," Proc. Electro International 1991, p. 580–585, Apr. 1991.*

Keihiro Ochiai, et al. "Snowfall and Rainfall Forecasting from Weather Radar Images with Artificial Neural Networks," Proc. IEEE ICNN 1995, vol. 2, p. 1182–1187, Nov. 1995.*

"Information Capacity of the Hopfield Model," Y.S. Abu–Mostaa and J. St. Jacques, IEEE Transactions on Information Theory, vol. IT–31, No. 4, pp. 461–464, Jul., 1985.

"A Learning Algorithm for Boltzmann Machines," D.H. Ackley, G.E. Hinton and T.J. Sejnowksi, Cognitive Science, vol. 9, pp. 147–169, 1985.

"Neural Theory of Association and Concept Formation," S.I. Amari, Biological Cybernetics, vol. 26, pp. 175–185, 1977.

"Learning by statistical cooperation of self–interested neuron–like computing elements," A.G. Barto, Human Neurobiology, vol. 4, pp. 229–256, 1985.

"The Temporal Kohonen Map," G.J. Chappell and J.G. Taylor, Neural Networks, vol. 6, pp. 441–445, 1993.

"Learning While Searching in Constraint Satisfaction Problems," R. Dechter, Proceedings of the Fifth National Conference on Artificial Intelligence, pp. 178–183, American Association for Artificial Intelligence, 1986.

(List continued on next page.)

Primary Examiner—Tālivaldis I. Šmits
(74) Attorney, Agent, or Firm—Finnegan, Henderson, Farabow, Garrett & Dunner, L.L.P.

(57) ABSTRACT

A method and apparatus for signal classification using a multilayer temporal relaxation network involves receiving an input signal feature vector, classifying a first signal feature, and classifying a second signal feature using contextual information. The multilayer temporal relaxation network applies a relaxation process that updates an activation value of a node in a first layer and updates an activation value of a node in a second layer. The multilayer network then generates a signal classification according to an activation value of a node in the multilayer network.

42 Claims, 21 Drawing Sheets

OTHER PUBLICATIONS

"TOM, A New Temporal Neural Net Architecture For Speech Signal Processing," S. Durand and F. Alexandre, IEEE International Conference on Acoustics, Speech, and Signal Processing Conference Proceedings, vol. 6, pp. 3549–3552, 1996.

"Synthesizing Constraint Expressions," E.C. Freuder, Communications of the Association for Computing Machinery (ACM), vol. 21, No. 11, pp. 958–965, Nov. 1978.

"Stochastic Relaxation, Gibbs Distributions, and the Bayesian Restoration of Images," S. German and D. German, IEEE Transactions of Pattern Analysis and Machine Intelligence, vol. PAMI–6, pp. 721–741, 1984.

"Boltzmann Machines: Constraint Satisfaction Networks that Learn," G.E. Hinton, T.J. Sejnowski, J. Terrance, and D.H. Ackley, Technical Report (CMU–CS–84–119, Carnegie Mellon University, May 1984.

"Learning and Relearning in Boltzmann Machines," G.E. Hinton and T.J. Sejnowski, Parallel Distributed Processing, vol. 1, pp. 283–317 (Chapter 7), MIT Press, 1986.

"Neural networks and physical systems with emergent collective computational abilities," J.J. Hopfield, Proceedings of the National Academy of Sciences USA, vol. 79, pp. 2554–2558, Apr. 1982.

"Neurons with graded response have collective computational properties like those of two–state neurons," J.J. Hopfield, Proceedings of the National Academy of Sciences USA, vol. 81, pp. 3088–3092, May 1984.

"Neural Computation of Decisions in Optimization Problems," J.J. Hopfield, Biological Cybernetics, vol. 52, pp. 141–152, 1985.

"Computing with Neural Circuits: A Model," J.J. Hopfield, Science, vol. 233, pp. 625–633, Aug. 1986.

"Transforming neural computations and representing time," J.J. Hopfield, Proceedings of the National Academy of Sciences USA, vol. 93, pp. 15440–15444, Dec. 1996.

"Optimization By Simulated Annealing," S. Kirkpatrick, C.D. Gelatt, Jr., and M.P. Vecchi, Science, vol. 220, No. 4598, pp. 671–680, May 1983.

"Optimization by Simulated Annealing: Quantitative Studies," S. Kirkpatrick, Journal of Statistical Physics, vol. 34, Nos. 5/6, 1984.

"The Self Organizing Map," T. Kohonen, Proceeding of the IEEE, vol. 78, No. 9, pp. 1464–1480 Sep. 1990.

"The Hypermap Architecture," T. Kohonen, Artificial Neural Networks, pp. 1357–1360, Elsevier Science Publishers, 1991.

"Adaptive bidirectional associative memories," B. Kosko, Applied Optics, vol. 26, No. 23, pp. 4947–4960, Dec. 1987.

"Analysis and Synthesis of a Class of Neural Networks: Linear Systems Operating on a Closed Hypercube," J. Li and A.N. Michel, IEEE Transactions on Circuits and Systems, vol. 36, No. 11, pp. 1405–1422, Nov. 1989.

"A Distributed Model of Human Learning and Memory," J.L. McClelland and D.E. Rummelhart, Journal of Experimental Psychology, vol. 114, pp. 159–188, 1985 and Parallel Processing, vol. 2, pp. 171–215 (Chapter 17), MIT Press, 1986.

"Interactive Processes in Speech Perception: The TRACE Model," Cognitive Psychology, vol. 18, pp. 1–86, 1986 and Parallel Distributed Processing, vol. 2, pp. 59–121 (Chapter 15), MIT Press, 1986.

"The Programmable Blackboard Model of Reading," Parallel Distributed Processing, vol. 2, pp. 123–169 (Chapter 16), MIT Press, 1986.

"A logical calculus of ideas immanent in nervous activity," W.S. McCulloch and W. Pitts, Bulletin of Mathematical Biophysics, vol. 5, pp. 115–133, 1943 and Chapter 2 Neurocomputing, Foundations of Research, edited by J.A. Anderson and E. Rosenfeld, MIT Press, 1988.

"Gibbs and Markov Random Systems With Constraints," J. Moussouris, Journal of Statistical Physics, vol. 10, pp. 11–33, 1974.

"A Biological Constrained Learning Mechanism in Networks of Formal Neurons," L. Personnaz, I Guyon, G. Dreyfus and G. Toulouse, Journal of Statistical Physics, vol. 43, Nos. 3/4, pp. 411–422, 1986.

"How we know universals: the perception of auditory and visual forms," W. Pitts and W.S. McCulloch, Bulletin of Mathematical Biophysics, vol. 9, pp. 127–147, 1947 and Chapter 3 in Neurocomputing, Foundations of Research, edited by J.A. Anderson and E. Rosenfeld, MIT Press, 1988.

"Constrained Differentizl Optimization for Neural Networks," J.C. Platt and Barr, Technical Report CS–TR–88–17, California Institute of Technology, 1988).

"Scene Labeling by Relaxation Operations," A. Rosenfeld, R.A. Hummel and S. W. Zucker, IEEE Transactions on Systems, Man, and Cybernetics, vol. SMC–6, pp. 420–433, 1976.

"Applying Contextual Constraints in Sentence Comprehension," M.F. St. John, and J.L. McClelland, Proceedings of the 1988 Connectionist Models Summer School Jun. 17–26, 1988, Carnegie Mellon University, pp. 338–346.

"Learning Applying Contextual Constraints in Sentence Comprehension," M.F. St. John and McClelland, Proceedings of the 1988 Connectionists Models Summer School, Morgan Kaufman, 1989.

"Neural computation by concentrating information in time," D.W. Tank and J.J. Hopfield, Proceedings of the National Academy of Sciences USA, vol. 84, pp. 1896–1900, Apr. 1987.

"Adaptive switching circuits," B. Widrow and M.E. Hoff, 1960 IRE Wescon Convention Record, New York: IRE, pp. 96–104 and Chapter 10 in Neurocomputing Founds of Research, edited by J.A. Anderson and E. Rosenfeld, MIIT Press, 1988.

"A Continuous–Time Asynchronous Boltzmann Machine," K. Yamanaka, A. Masahiro and T. Miyajima, Neural Networks, vol. 10, No. 6, pp. 1103–1107, 1997.

"An Application of Recurrent Nets to Phone Probability Estimation," A.J. Robinson, IEEE Transactions on Neural Networks, vol. 5, No. 2, p. 298–305, Mar. 1994.

Neural Networks for Pattern Recognition, C.M. Bishop, Oxford University Press, 1995.

Fundamentals of Speech Recognition, L. Rabiner and B.H. Juang, Prentice–Hall, Inc., 1993.

J. Sirosh and R. Miikkulainen, "How Lateral Interaction Develops in a Self–Organizing Feature Map", Proceedings of the IEEE International Conference on Neural Networks, 1993.

Y. Choe, J. Sirosh and R. Miikkulainen, "Laterally Interconnected Self–Organizing Maps in Hand–Written Digit Recognition", Advances in Neural Information Processing Systems 8, MIT Press, 1996.

R. Miikkulainen, "Self–Organizing Process Based on Lateral Inhibition and Synaptic Resource Redistribution", Proceedings of the International Conference on Artificial Neural Networks, 1991.

Y. Choe and R. Miikkulainen, "Self–Organization and Segmentation in a Laterally Connected Orientation Map of Spiking Neurons", In press, Neurocomputing (1998).

Liu, F. et al., "Flexible Vowel Recognition By The Generation of Dynamic Coherence In Oscillator Neural Networks: Speaker–Independent Vowel Recognition," Biological Cybernetics, vol. 71, No. 2, pp. 105–114, XP000d453399 (1994).

Si, J., et al., "Analysis and Synthesis of Discrete–Time Neural Networks With Multilevel Threshold Functions," Analog, Circuits and Neural Networks, Singapore, vol. 3, No. Symp. 24, pp. 1461–1464 XP000370882 (1991).

Hild, H., et al., "Multi–Speaker/Speaker–Independent Architectures for the Multi–Statetime Delay Neural Network," Proceedings IEEE International Conference on Acoustics, Speech, and Signal Processing (ICASSP '93), vol. 2, pp. 255–258, USA XP000427774 (1993).

Jameel, A., "Experiments With Various Recurrent Neural Network Architectures for Handwritten Character Recognition," Proceedings of the International Conference on Tools with Artificial Intelligence, pp. 548–554, XP000523666 (1994).

Chen, T., et al., "Rainfall Prediction of Geostationary Meterological Satellite Images Using Artificial Neural Network," Better Understanding of Earth Environment, vol. 3, pp. 1247–1249, XP000481829 (1993).

Hagiwara, M. "Self–Organizing Neural Network for Spatio–Temporal Patterns," Proceedings of the International Joint Conference on Neural Network (IJCNN), pp. 521–524, XP000235902 (1991).

* cited by examiner

SIGNAL FEATURE VECTOR

METHOD AND APPARATUS FOR SIGNAL CLASSIFICATION USING A MULTILAYER NETWORK

BACKGROUND OF THE INVENTION

The present invention relates generally to signal processing systems and methods, and more particularly to signal classification systems.

Automatic signal recognition, such as automatic speech recognition (ASR), by computer is a particularly difficult task. Despite an intensive world-wide research effort for over forty years, existing ASR technology still has many limitations. Moderate success has been achieved for controlled environment, small vocabulary, limited scope applications. Moving beyond these limited applications is difficult because of the complexity of the ASR process.

In the ASR process for a large vocabulary system, the speech input begins as a thought in the speaker's mind and is converted into an acoustic wave by his vocal apparatus. This acoustic wave enters the ASR machine through a transducer/converter which changes the acoustic wave from pressure variations into a representative stream of numbers for subsequent computer processing. This number stream is grouped into successive time intervals or segments (typically 10–20 milliseconds). A feature extraction procedure is applied to each interval. The features are a set of parameters that describe the characteristics of the interval. Their exact definition depends upon the particular ASR method. The features can be used to classify the groups into subword units, usually phonemes. A classification procedure is applied to the resulting sequence to produce words for the text output. This is the general ASR procedure; specific systems vary in the features and classification methods used.

The variation in speakers' acoustic production compounds the classification complexity. Different speakers pronounce sounds differently and at different voice pitches. Even the same sound spoken by the same speaker will vary from instance to instance. In addition, a transducer (such as a microphone), captures and adds to the signal other sources besides the speaker, such as room noise, room echo, equipment noise, other speakers, etc. Grouping the data into time intervals for feature analysis assumes that the signal is stationary throughout the interval with the changes only occurring at the boundaries. This is not strictly true; in fact, the validity of the assumption varies with the type of speech sound. This assumption causes variation in the feature extraction process. Since speech is a continuous process breaking up the sounds into a finite number of subword units will also contribute phonological variation. There is no simple, direct, consistent relationship between the spoken word input and the analysis entities used to identify it.

Generally, there have been three approaches to ASR: acoustic-phonetic, pattern recognition, and artificial intelligence (Fundamentals of Speech Recognition, L. Rabiner and B. H. Juang, Prentice-Hall, Inc., 1993., p. 42). The acoustic-phonetic approach attempts to identify and use features that directly identify phonemes. The features are used to segment and label the speech signal and directly produce a phoneme stream. This approach assumes that a feature set exists such that definitive rules can be developed and applied to accurately identify the phonemes in the speech signal and therefore determine the words with a high degree of certainty. Variance in the speech signal fatally weakens this assumption.

The pattern matching approach has been most successful to date. The features are usually based upon a spectral analysis of speech wave segments. Reference patterns are created for each of the recognition units, usually several for each unit to cover variation. The reference patterns are either templates or some type of statistical model such as a Hidden Markov Model (HMM). An unknown speech segment can be classified by its "closest" reference pattern. Specific implementations differ in use of models versus templates, type of recognition unit, reference pattern creation methods, and classification (or pattern recognition) methods.

Pattern matching ASR systems integrate knowledge from several sources prior to making the final output decision. Many systems typically use a language model. A language model improves recognition by providing additional constraints at the word level; word pair probabilities (bigrams), word triplet probabilities (trigrams), allowable phrases, most likely responses, etc. depending on the application. Knowledge sources can be integrated either bottom up or top down. In the bottom up approach, lower level processes precede higher level processes with the language model applied at the final step. In the top down method, the model generates word hypotheses and matches them against the input speech signal.

The best performing large vocabulary systems to date are top down pattern matchers that use HMMs with Gaussian mixture output distributions to model phonemes. Processing begins when an entire phrase is input. A language model is used to generate candidate phrases. The canonical phonetic pronunciation of each candidate phrase is modeled by connected HMM phonetic models that produce a sequence of feature probability distributions. These distributions are compared to the features of the input speech phrase and the most likely candidate phrase is selected for output. High performance on large vocabularies requires large amounts of computational capacity in both memory and time; real time speech recognition is not currently possible on a desktop system without significant performance compromises. Other drawbacks include sensitivity to the amount of training data, sensitivity of reference patterns to speaking environment and transmission channel characteristics, and non-use of specific speech knowledge.

Artificial intelligence is a collection of implementation techniques rather than a separate ASR approach. They are generally of two types, expert systems and neural networks. Expert systems provide a systematic method to integrate various knowledge sources through development and application of rules. They are best suited for the acoustic-phonetic approach. Neural networks were originally developed to model interactions within the brain. They come in many varieties but they are pattern recognizers which require training to determine network parameter values. They can model non-linear relationships and generalize, that is classify, patterns not in the training data. Neural networks have been successfully used in ASR to classify both phonemes and words.

There is, therefore, a need for a signal processing and classification system that achieves increased performance in time, accuracy, and overall effectiveness. Moreover, there is a need for a signal processing and classification system that provides highly accurate, real-time, speaker independent voice recognition on a desktop computer.

SUMMARY OF THE INVENTION

Methods and apparatus consistent with this invention for signal classification using a network include several steps performed using a multilayer network. The steps include: receiving an input signal feature vector in a first layer;

applying a relaxation process that updates an activation value of nodes in the multilayer network for a current time step; outputting a classification.

A multilayer network for signal classification consistent with the present invention includes: a first layer for classifying a first signal feature, wherein the first layer includes structure for receiving an input signal feature vector; a second layer for classifying a second signal feature representing a context of the first signal feature; structure for interaction between the first and second layers; applying a relaxation process that updates an activation value for a node in each of the first and second layers; and structure for generating a signal classification from the first and second classified features according to an activation value of a node in the multilayer network.

Both the foregoing general description and the following detailed description are exemplary and explanatory and are intended to provide further explanation of the invention as claimed.

DESCRIPTION OF THE FIGURES

The accompanying drawings provide a further understanding of the invention. They illustrate embodiments of the invention and, together with the description, explain the principles of the invention.

DETAILED DESCRIPTION OF THE INVENTION

Reference will now be made in detail to preferred embodiments illustrated in the accompanying drawings. The same numbers in different figures refer to like or similar elements.

Figure 1:
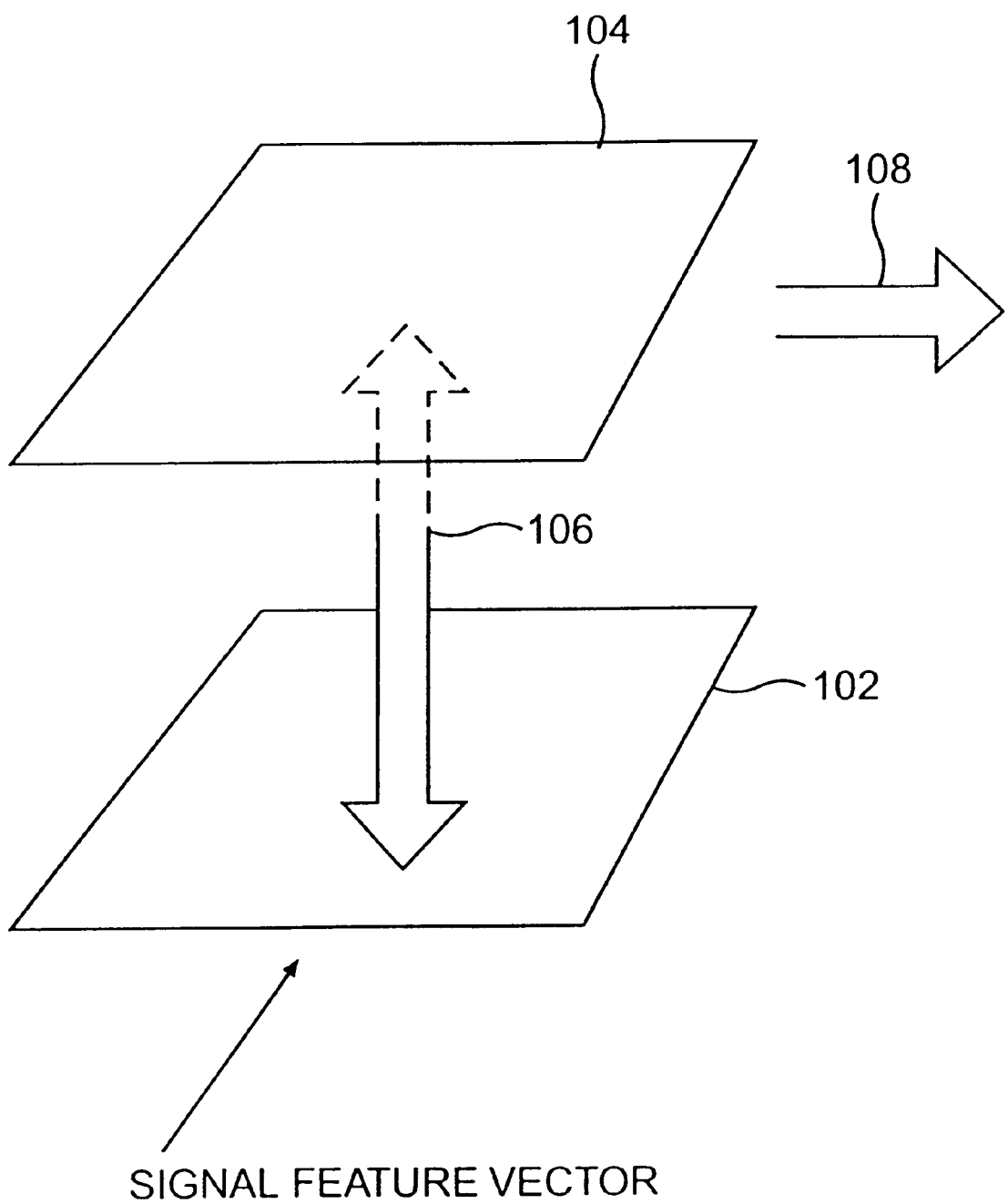
FIG. 1 is a block diagram of a multilayer network for signal classification consistent with the present invention.

FIG. 1 shows first neural network layer 102, second neural network layer 104, interconnector 106, and classification output 108. Each neural network layer is composed of one or more computational elements called "neurons."

Figure 2:
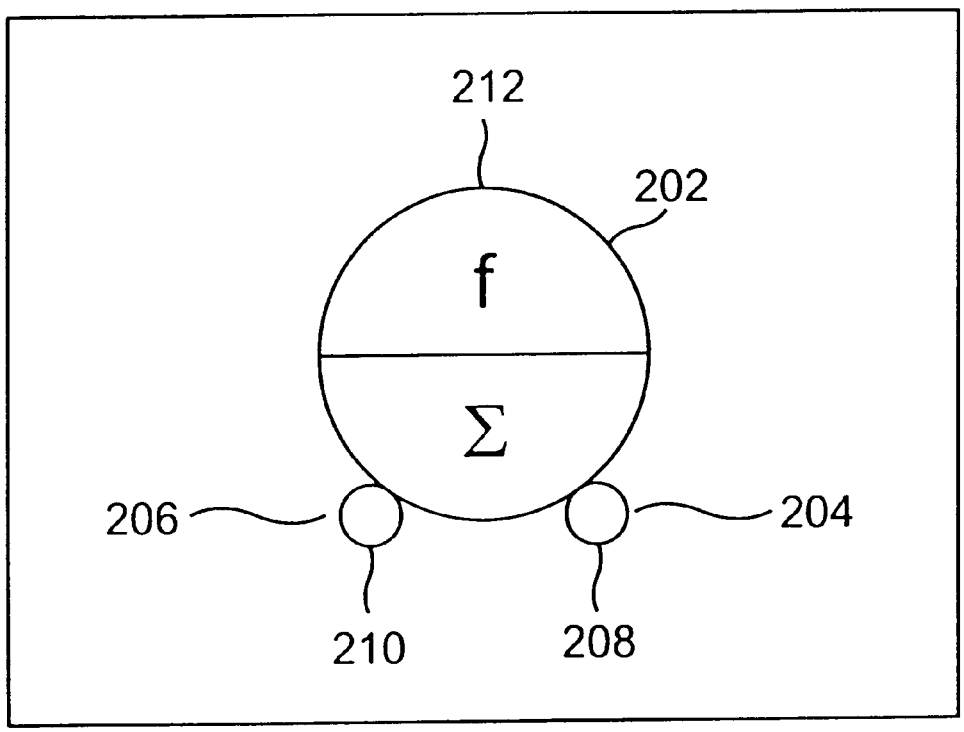
FIG. 2 is a block diagram of a neuron contained in a multilayer network for signal classification in accordance consistent with the present invention.
Figure 3:
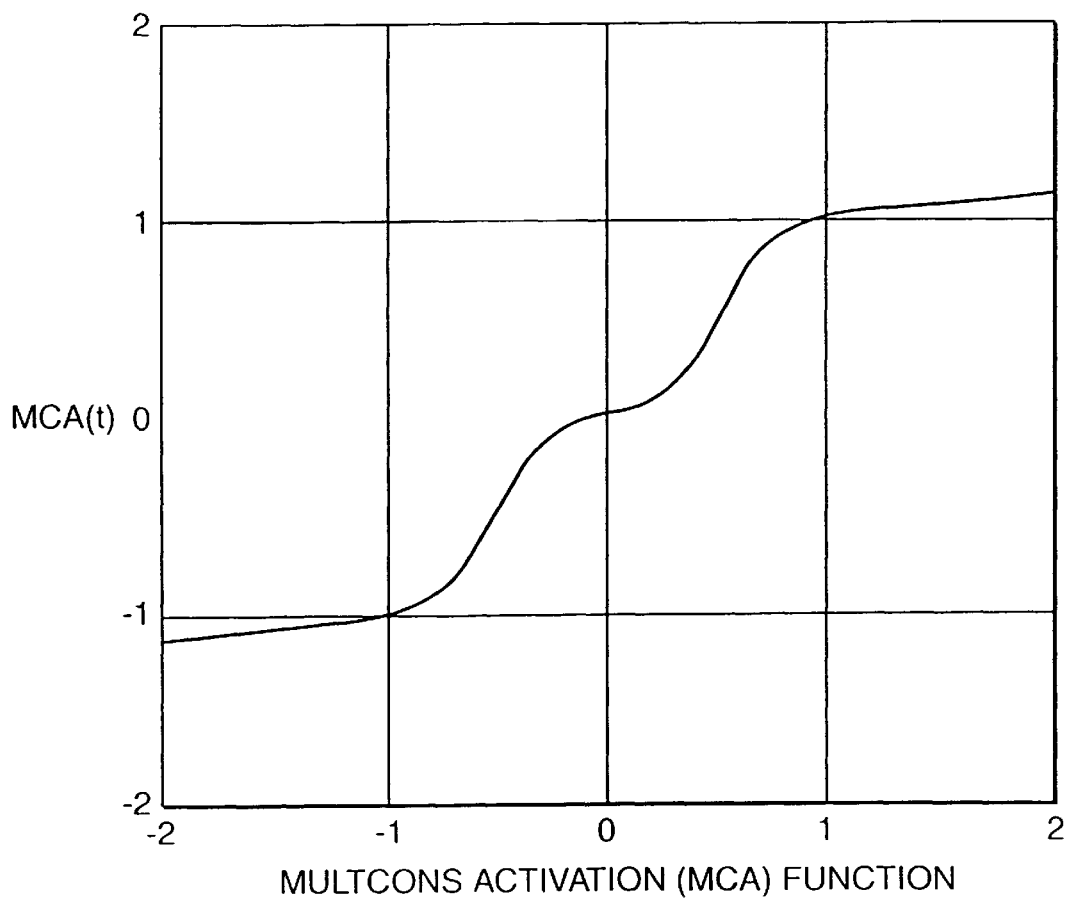
FIG. 3 is a graph of an activation function consistent with one embodiment of the present invention.

FIG. 2 shows one example of a neuron comprising activation function element 202, weights 204 and 206, inputs 208 and 210, and output 212. Each neuron receives data at inputs 208 and 210, and multiplies the data by weights 204 and 206, respectively. The input values are outputs from other neurons. Subsequently, activation function element 202 sums the weighted input data, and applies activation function $f$ to the sum and produces output 212. One example of an activation function suitable for implementation in activation function element 202 is the MULTCONS activation (MCA) function shown in FIG. 3. The MCA function of FIG. 3 has a flat response in the center of the domain where input to the neuron produces little change in the neuron output. Both ends of the MCA function provide soft clamping at the range limits, so that neuron input changes in the portion of the domain corresponding to function endpoints continue to produce small changes in the neuron output. The MCA function of FIG. 3 is derived from two scaled and translated logistic functions cascaded together to produce a flat spot near the middle of the domain and linear extensions from the knees of the clamping regions. The equation for the MCA function of FIG. 3 is:

$$f(t)=k_0(t+1)-1,$$

when $t<-1$;

$$-k_1 L((-t/k_2)-2)+k_3,$$

when $-1 \leq t<0$; 0 when $t=0$;

$$k_1 L((t/k_2)-2)-k_3,$$

when $0<t \leq 1$; and $$k_0(t-1)+1,$$

when $t>1$. The operator $L(t)=1/(1+e^{-2t})$. The values used for the constants $k_0$–$k_3$ in the MCA function of FIG. 3 are (rounded values): $k_0$=0.1; $k_1$=1.0; $k_2$=0.3; and $k_3$=0.02. Accordingly, the MCA function of FIG. 3 has a stable region centered at zero and extends to ±0.25. The soft clamping begins at ±1. The input values for a neuron are scaled to remain within the domain (−1, 1) approximately 90% of the time.

Using the MCA function of FIG. 3, when the sum of the weighted inputs to a neuron is in a predetermined neighborhood of zero, the neuron outputs a value close to zero. This output corresponds to a "do not know" signal classification, indicating that the neuron cannot make a confident decision from the strength (numerical value) of the neuron input. When the sum of the weighted inputs to a neuron extends beyond the neighborhood, then a small change in neuron input produces a large change in neuron output. At the range limits, the neuron output changes much more slowly relative to the input, but does not remain constant. This provides a neuron with a way to exert a greater influence over competing neurons if input to the neurons is especially strong.

Figure 4:
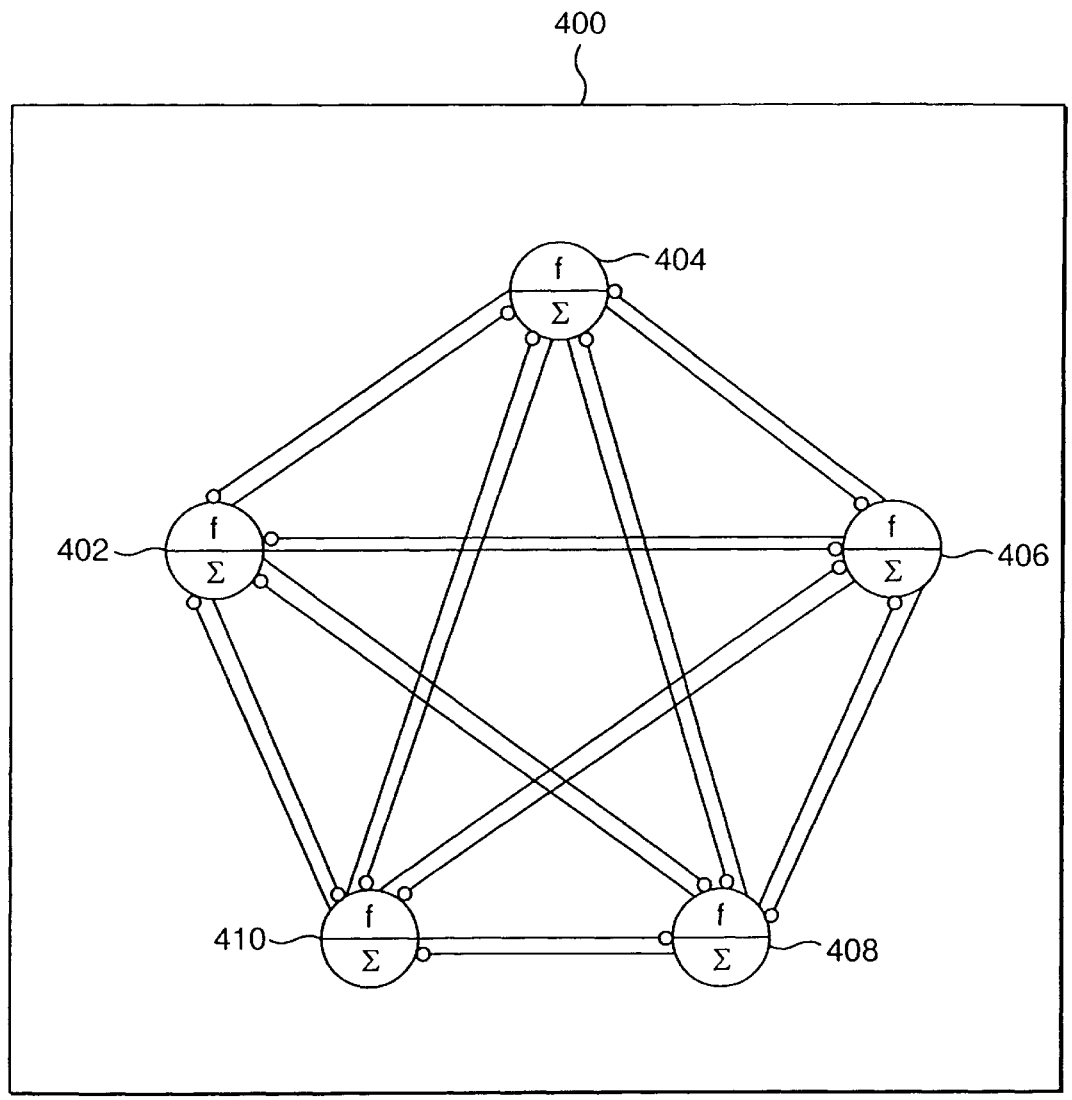
FIG. 4 is a schematic diagram of one time step of a neural network layer of a multilayer network for signal classification consistent with the present invention.

One of ordinary skill in the art will recognize that there are many alternative implementations of a neuron. For example, a neuron may have only one, or more than two weighted inputs. Moreover, many activation functions can be used, such as the activation functions described in "Neural Networks for Pattern Recognition," Chapter 3, C. M. Bishop, herein incorporated by reference. Cascading and interconnecting neurons 402 through 410, as illustratively shown in FIG. 4, creates one time step of neural network layer 400.

The weights of a neural network are selected so that the output of the neurons classifies the input presented to the neural network. The process of setting the weights in a neural network so that the output of the neurons in the network responds in a manner that properly labels an input feature vector is known as neural network training. During neural network training, many input data values representing feature vectors of signals from each of the detectable classes of signals are sequentially input to the neurons of the neural network layer. The neuron weights are adjusted under computer program control until all of the neurons in the neural network produce the desired output for each input signal. Following this training procedure, when the neural network receives an unknown signal feature vector the network classifies the input signal through the activation values produced by the neural network neurons. The weights of the neurons can be set by training methods known in the art, such as the delta rule or some variation thereof, see chapter 3, C. M. Bishop.

When the multilayer network of the block diagram of FIG. 1 is configured for signal classification, neural network layer 102 receives a feature vector representing several features of an input signal. The activation functions and weights in neural network 102 are selected for optimum classification of a signal based on first signal feature values and temporal context. The activation functions and weights in neural network 104 are selected for optimum classification of a signal based on a second signal feature representing the first and second signal values and temporal context.

Interconnector 106 controls the interaction between the neurons in neural network layer 102 and the neurons in neural network layer 104 of the multilayer network shown in FIG. 1. Part of this interaction includes a relaxation process that updates the activation values of neurons in the neural network layers 102 and 104. The relaxation process is a control process implemented in either hardware or software that adjusts the activation values of neurons in a multilayer network until the neurons reach a relaxed activation level, or "steady state."

Classifier 108 generates a signal classification from the feature classifications made by neural network layer 102 and neural network layer 104. Classifier 108 generates a signal classification preferably by comparing the activation values of neurons in neural network layer 104 to each other. The signal classification produced by the network corresponds to the neuron in neural network layer 104 with largest activation value and also meeting predetermined threshold criteria.

Figure 5:
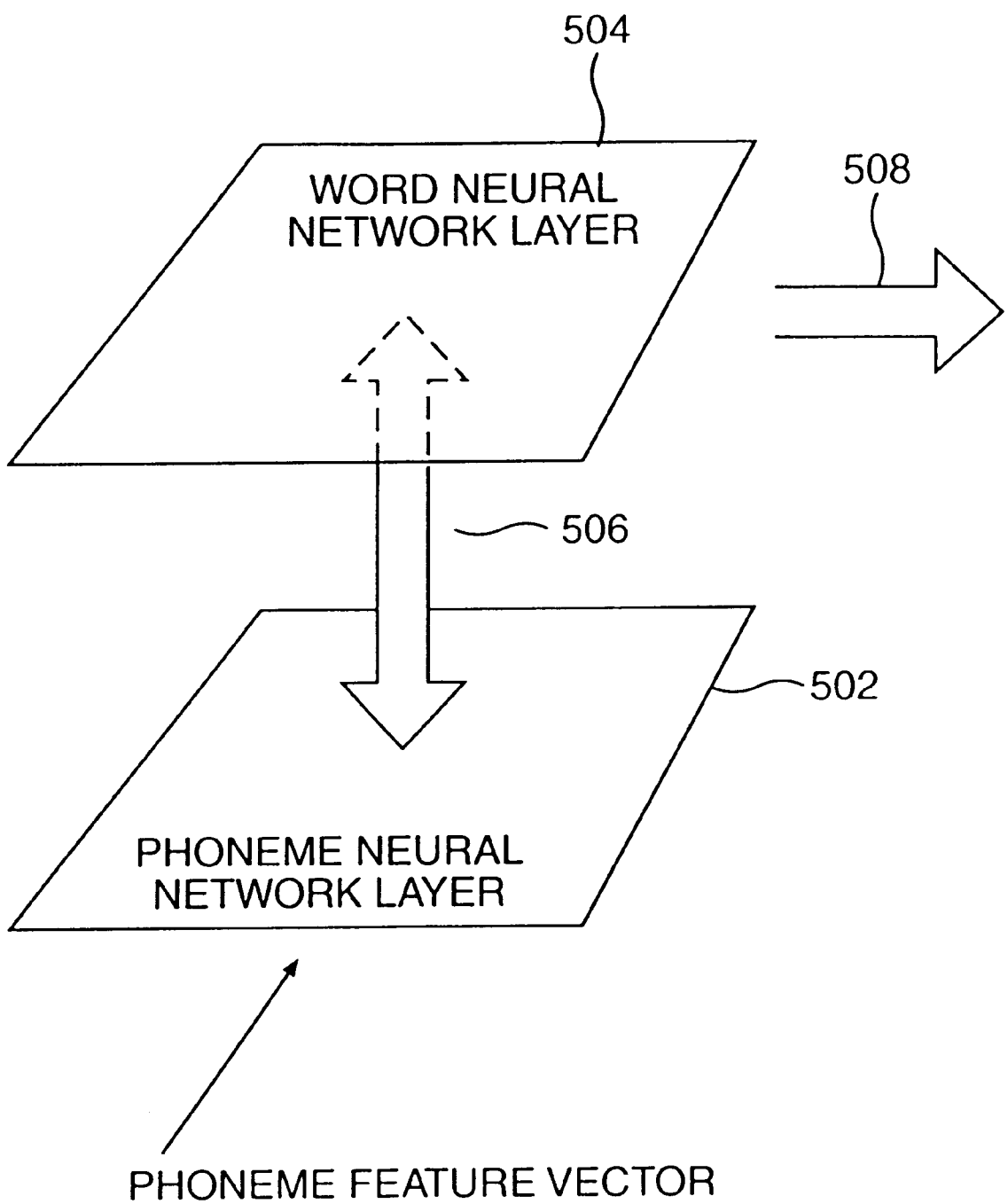
FIG. 5 is a block diagram of a multilayer network for classifying a signal representing a spoken word consistent with the present invention.

FIG. 5 is a block diagram of a multilayer network for classifying a signal representing a spoken word. FIG. 5 shows phoneme neural network layer 502, word neural network layer 504, interconnector 506, and classifier 508. Neural network layer 502 receives a feature vector representing features of detected phonemes of spoken words. A phoneme is a sound made during speech. A spoken word is made up of a sequence of phonemes. For example, the English language has approximately forty phonemes. A list of the phonemes for the English language and a method for encoding phonemes in a feature vector is described in U.S. Pat. No. 5,640,490, herein incorporated by reference. There can be a substantial amount of pre-processing of a received signal representing a spoken word prior to input to the multilayer network. This pre-processing is discussed in U.S. Pat. No. 5,640,490. The activation functions and weights in phoneme neural network layer 502 are selected for optimum classification of phonemes. This activation functions and weights in word neural network layer 504 are selected for optimum classification of spoken words.

Interconnector 506 controls the interaction between the neurons in phoneme neural network layer 502 and the neurons in word neural network layer 504 of the multilayer network shown in FIG. 5. Part of this interaction includes a relaxation process that updates the activation values of neurons in the phoneme neural network layer 502 and word neural network layer 504. The interaction of word neural network layer 504 with phoneme neural network layer 502 provides a context for speech recognition where the detected speech is coded using low level features, such as phonemes, prior to classification.

Classifier 508 generates a signal classification from the feature classifications made by phoneme neural network layer 502 and word neural network layer 504. Classifier 508 generates a signal classification preferably by comparing the activation values of neurons representing words in word neural network layer 504. The signal classification produced by the network corresponds to the neuron in word neural network layer 504 with the largest activation value and also meeting predetermined threshold criteria.

An embodiment of a phoneme neural network layer consistent with the present invention has one neuron for each detectable phoneme, accordingly, such a neural network layer has forty phoneme neurons for each time step. The output of each neuron preferably connects to the input of every other neuron in the same time step as well as to preceding and following time steps of the phoneme neural network layer. Therefore, the fully interconnected neurons in the phoneme neural network layer have a structure that is similar to the neurons shown in FIG. 2 with inputs from preceding and following phoneme neurons, competing phonemes neurons, active word neurons, and phoneme estimates. An embodiment of a word neural network layer consistent with the present invention has one neuron for each detectable spoken word.

Figure 6:
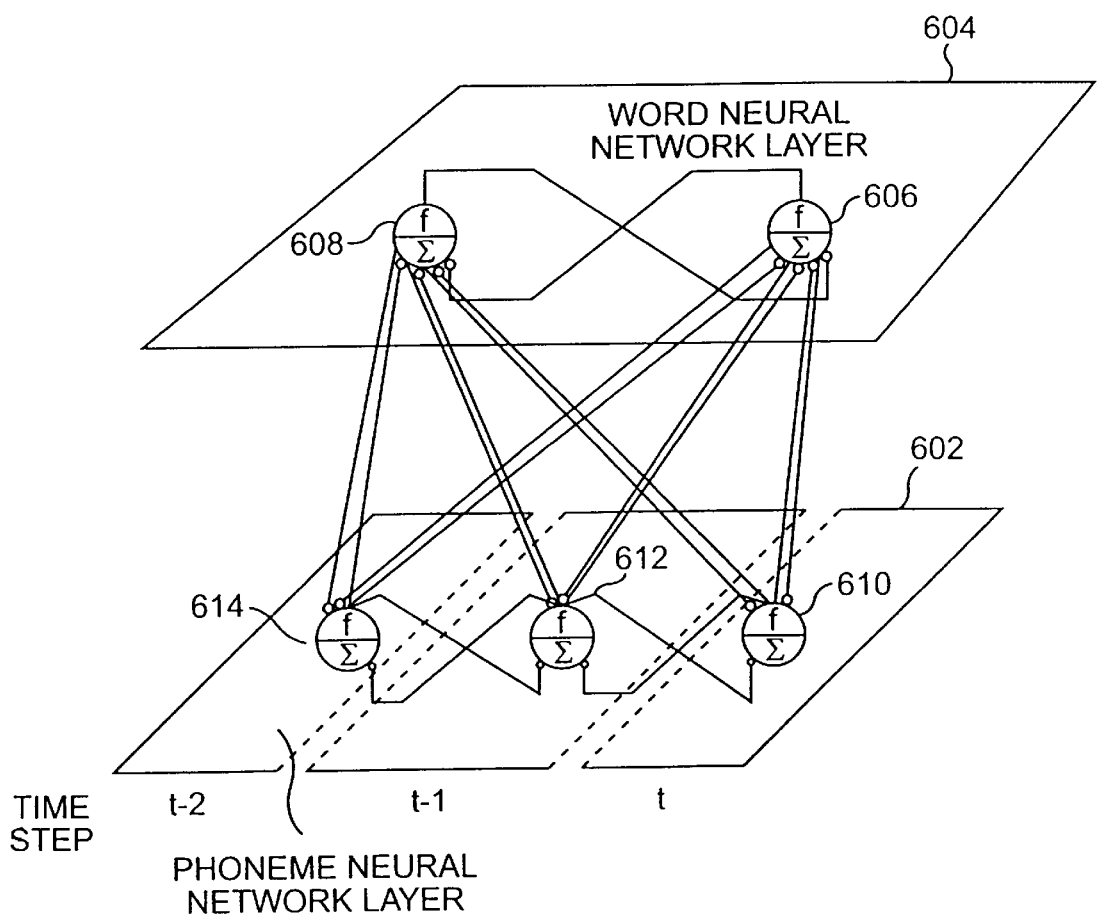
FIG. 6 is a block diagram of a multilayer network with a reduced number of word neurons and phoneme neurons representing three consecutive time steps consistent with the present invention.

FIG. 6 is a block diagram of a multilayer network for speech recognition with a reduced number of word neurons 608 and 606 in word neural network layer 604, and phoneme neurons 610, 612, and 614 in phoneme neural network layer 602, to illustrate the interconnections among neurons within a neural network layer and between neural network layers. In FIG. 6, the word corresponding to word neuron 608 competes with the word corresponding to neuron 606, so the output of word neuron 606 connects to the input of word neuron 608, and the output of word neuron 608 connects to the input of word neuron 606. The phoneme neurons of phoneme neural network layer 602 are fully interconnected. The output of phoneme neuron 614 connects to the input of phoneme neuron 612 at the preceding time step. The output of phoneme neuron 612 connects both to the input of preceding phoneme neuron 614 and the input of following phoneme neuron 610. The output of phoneme neuron 610 connects to the input of phoneme neuron 612 at the preceding time step. Outputs of phoneme neurons of phoneme neural network layer 602 connect to inputs of word neurons in word neural network layer 604. The outputs of word neurons in word neural network layer 604 connect to the inputs of phoneme neurons in phoneme neural network layer 602. The existence and strength of these connections is determined by word phonetic spelling.

Figure 7:
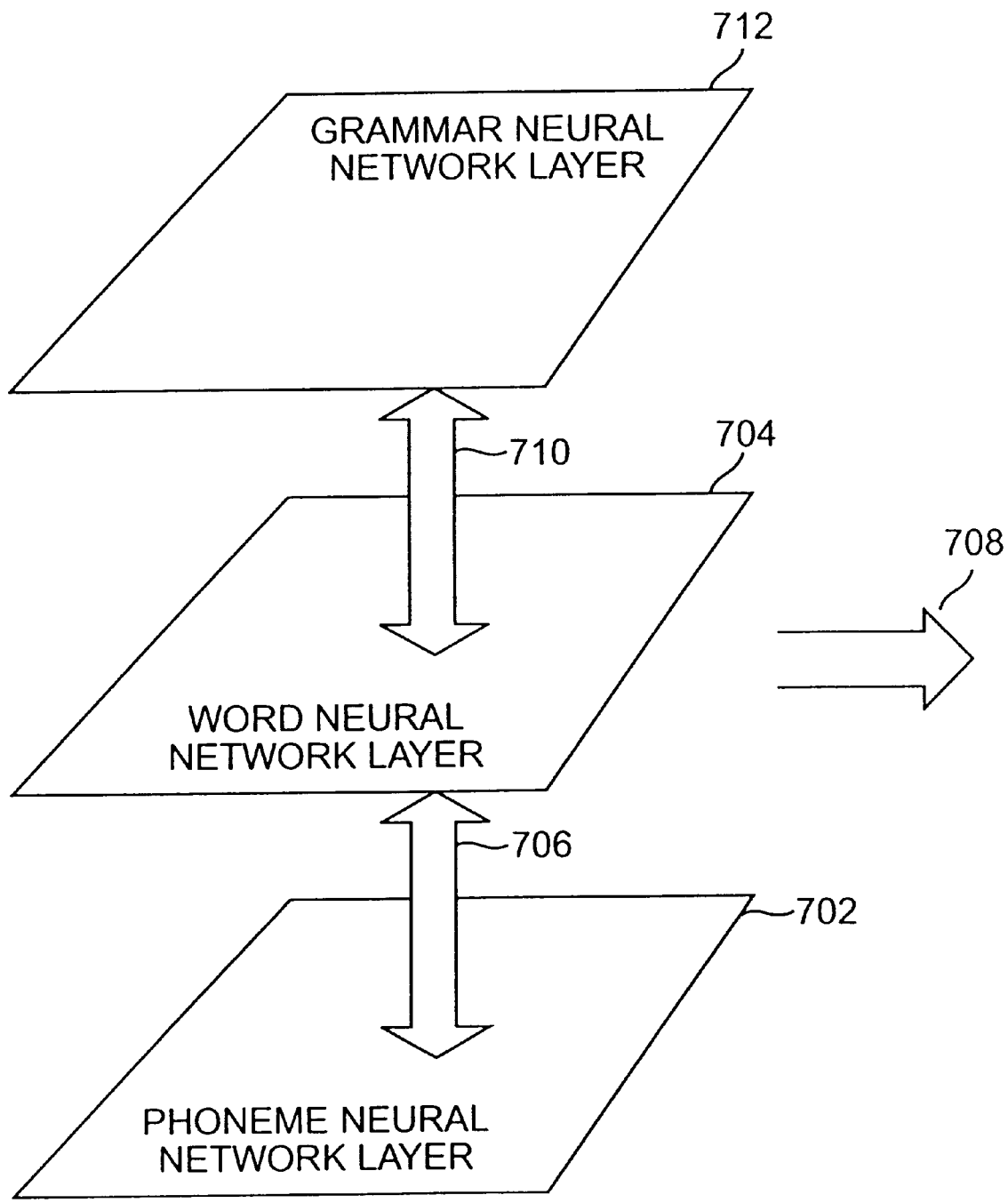
FIG. 7 is a block diagram of a multilayer network having grammar, word, and phoneme neural network layers for classifying a signal representing a spoken word consistent with the present invention.

FIG. 7 shows phoneme neural network layer 702, word neural network layer 704, grammar neural network layer 712, interconnector 706, interconnector 710, and classifier 708. In another embodiment consistent with the claims of the invention, the multilayer network for speech recognition described in greater detail above has grammar neural network layer 712 connected to word neural network layer 704 through interconnector 710. Grammar neural network layer 712 includes neurons for each grammatical part of speech that becomes active when the spoken word detected by word neural network layer 704 is of the corresponding part of speech. Grammar neural network layer 712 provides an added layer of higher order contextual information to word layer 704. As the multilayer network processes input phoneme feature vectors, classifier 708 makes word recognition decisions according to which word neurons are activated in word neuron layer 704.

Other layers can be added to the multilayer networks shown to provide additional context for speech recognition. For example, a fourth neural network layer, trained to recognize certain sequences of words can be added to provide context representing transaction specific dialogs, task syntax, such as sequences of words typically spoken during a catalog order or while placing a long distance telephone call. Among other possible layers are: phrase, sentence, semantics, topic, and prosodics.

Figure 8:
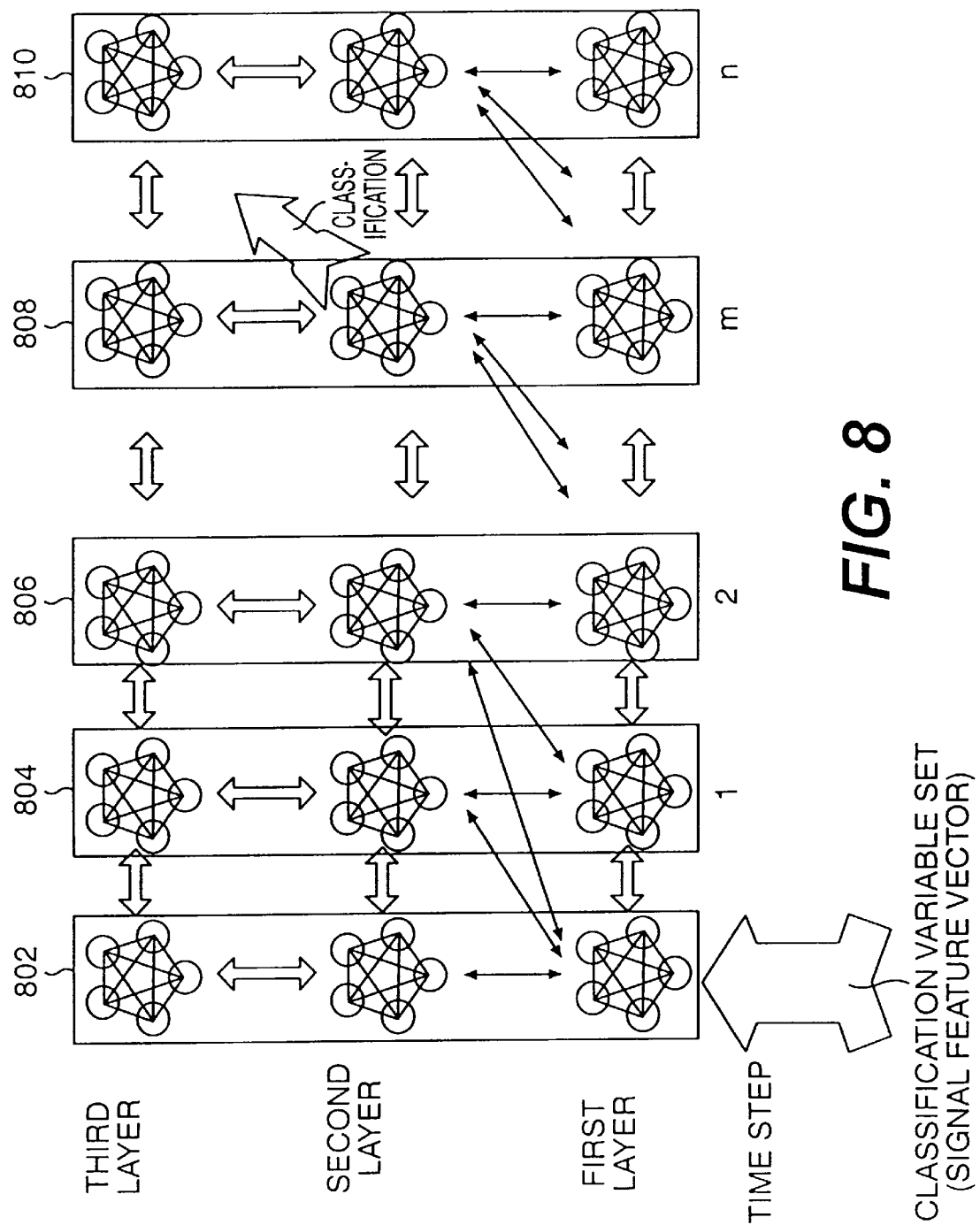
FIG. 8 is a schematic diagram of the temporal interaction of layer time steps consistent with the present invention.

FIG. 8 is a schematic diagram of the interaction of neural networks layers over several time steps during classification. FIG. 8 includes neural networks 802, 804, 806, 808, and 810 corresponding to time steps 0, 1, 2, m, and n, respectively. To have a sufficient amount of context available to the network to make a proper classification, the classifier waits for several time steps, for example fifteen time steps, before making a decision. The number of time steps m can be established dynamically by linking this number to a classification accuracy statistic measuring certain identification criteria. As shown in FIG. 8, network 808 classifies the input signal at time step m. At the beginning of each input cycle the entire network is time stepped by moving all the neuron activations ahead one time step, i.e., time step 802 to 804, time step 804 to 806, etc. Then the first layer of neural network 802 (time step 0) receives a new seed feature vector. All neurons at all time steps are relaxed for a number of cycles within a given input cycle. FIG. 8 also illustrates that during relaxation, each neural network interacts with neural networks corresponding to previous and subsequent time steps. For example, the first layer of neural network 804 at time step 1 receives input from neural network 802 at time step 0 and neural network 806 at time step 2.

Figure 9:
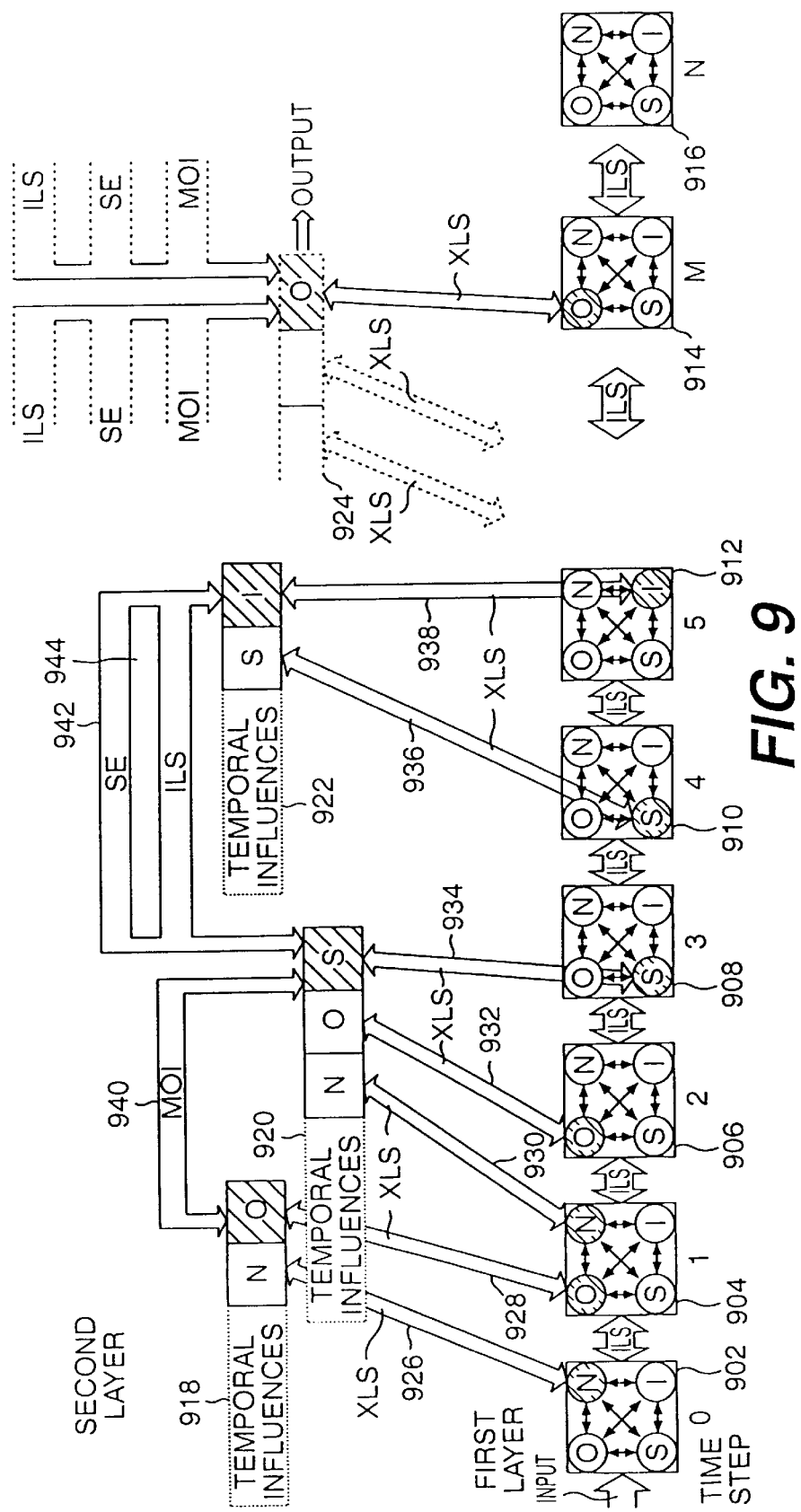
FIG. 9 is a schematic diagram of the temporal interaction of two layers consistent with the present invention.

FIG. 9 is schematic diagram illustrating the interaction of neural networks having two layers over several time steps consistent with the present invention. FIG. 9 includes neural network first layer at time step 0 902, neural network first layer at time step 1 904, neural network first layer at time step 2 906, neural network first layer at time step 3 908, neural network first layer at time step 4 910, neural network first layer at time step 5 912, neural network first layer at time step m 914, and neural network first layer at time step n 916. The first neural network layer includes only four neurons at each time step to simplify the description. Each neuron in the neural network's first layer corresponds to an element of input data represented by the variables O, N, S, and I. At each time step in the first layer in FIG. 9, the active neuron (e.g., a neuron with an activation value greater than zero) is shaded.

FIG. 9 shows four second layer neurons at selected time steps: neural network second layer neuron 918, neural network second layer neuron 920, neural network second layer neuron 922, and neural network second layer neuron 924, spanning time steps 0-m of a simplified second neural network layer. A second layer neuron responds to a sequence, over consecutive time steps, of first layer neurons. A second layer neuron becomes active when that sequence or a similar sequence of active first layer neurons occurs. It is placed at the same time step as the first active node in the first layer sequence shown by the shading in FIG. 9. Not shown in FIG. 9 are the remaining second layer neurons for each of the time steps depicted. The activation value of each second layer neuron is influenced by the activation values of first layer neurons over several time steps. FIG. 9 illustrates this temporal influence. The number of time steps spanned by each neural network second layer neuron is depicted in FIG. 9 by the width of the rectangle representing that neuron. For example, neural network second layer neuron 918 spans time steps 0 and 1, neural network second layer neuron 920 spans time steps 1, 2, and 3, and neural network second layer neuron 922 spans time steps 4 and 5.

Weights 926–938 provide feedback between first layer neurons and second layer neurons. For example, second layer neuron 920, which spans three time steps, receives an activation value contribution from: neural network first layer 904 weighted by weight 930, neural network first layer 906 weighted by weight 932, and neural network first layer 908 weighted by weight 934. In addition to the weighted interaction between neurons of the first and second neural network layers, there is also weighted interaction among neurons of the second layer provided by weights 940–944. For example, weight 940 inhibits temporally overlapping neurons in the second layer from all having positive activation values, weight 942 inhibits neurons without active neurons immediately preceding and following temporally and promotes those that do have such active neurons. Weight 944 promotes the proper sequencing of active nodes based on sequence plausibility.

Figure 10:
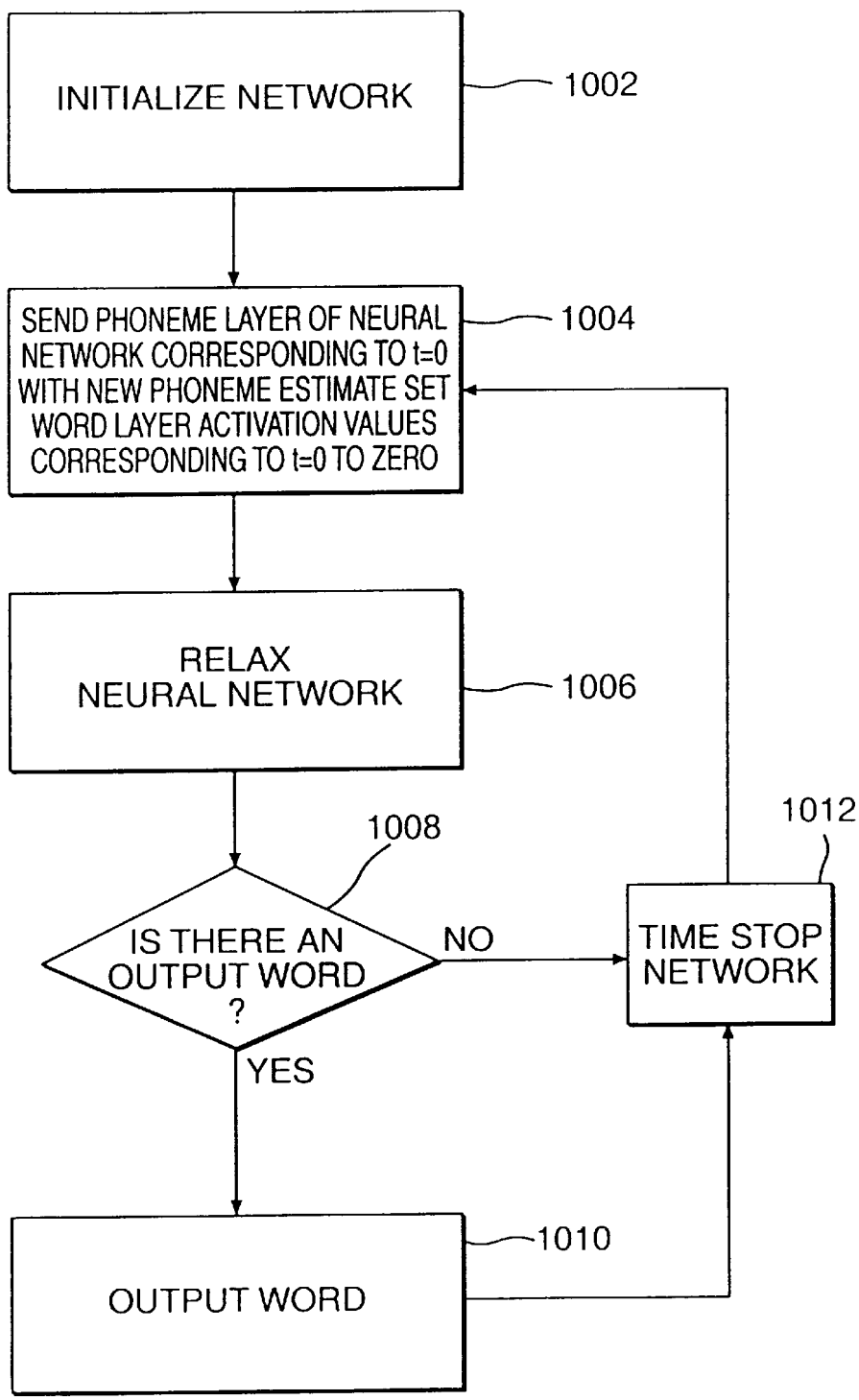
FIG. 10 is a flow diagram of a method for classifying a signal representing a spoken word using a multilayer network consistent with the present invention.

FIG. 10 is a flow diagram of a method for classifying a signal representing a spoken word using a multilayer network consistent with the present invention. At step 1002, the activation values of the all of the neural network layers are set to an initial value of zero. The phoneme layer of the neural network corresponding to time step 0 is seeded with a phoneme estimate, and activation values in the word layer corresponding to time step 0 are set to 0 (step 1004). Each of the neural networks for every time step undergoes a relaxation process that updates the activation values of neurons in the neural network layers (step 1006). The activation values of neurons of the word neural network layer at a specified time step (for example time step fifteen) are then checked to determine whether the network has a possible word classification output, indicated, for example, by a word neuron having the largest positive activation value above a predetermined threshold (step 1008). If there is such a classified word, the neural network outputs the word (step 1010). The network is time stepped and returns to step 1004 (step 1012).

Figure 11:
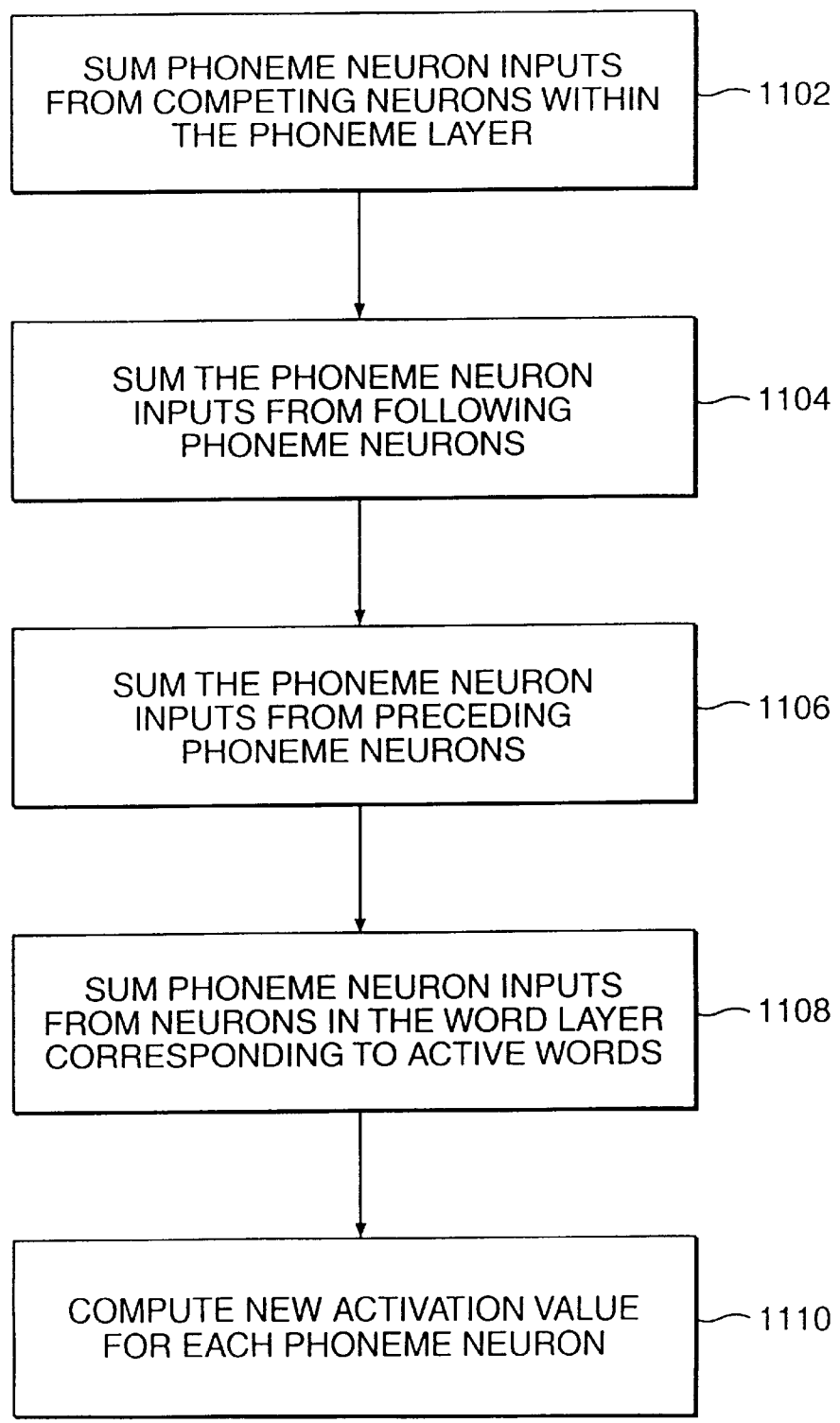
FIG. 11 is a flow diagram of a method for updating a phoneme neuron activation value consistent with the present invention.

The flow diagram of FIG. 11 illustrates relaxation process substeps for updating a phoneme neuron activation value. A neuron in the phoneme neural network layer is updated by first summing phoneme neuron inputs from competing neurons within a phoneme layer (step 1102). Then additional sums are computed within the layer: the sum of inputs from phoneme neurons from neural networks corresponding to following time steps (step 1104) and the sum of inputs from the neural networks corresponding to the preceding time steps (step 1106). The process continues by summing the phoneme neuron inputs from neurons in the word layer corresponding to active words (step 1108). The relaxation process then computes a new activation value for each phoneme neuron based on the sums computed at steps 1102–1108 (step 1110). The process is repeated for all phoneme neurons in all time steps.

Figure 12:
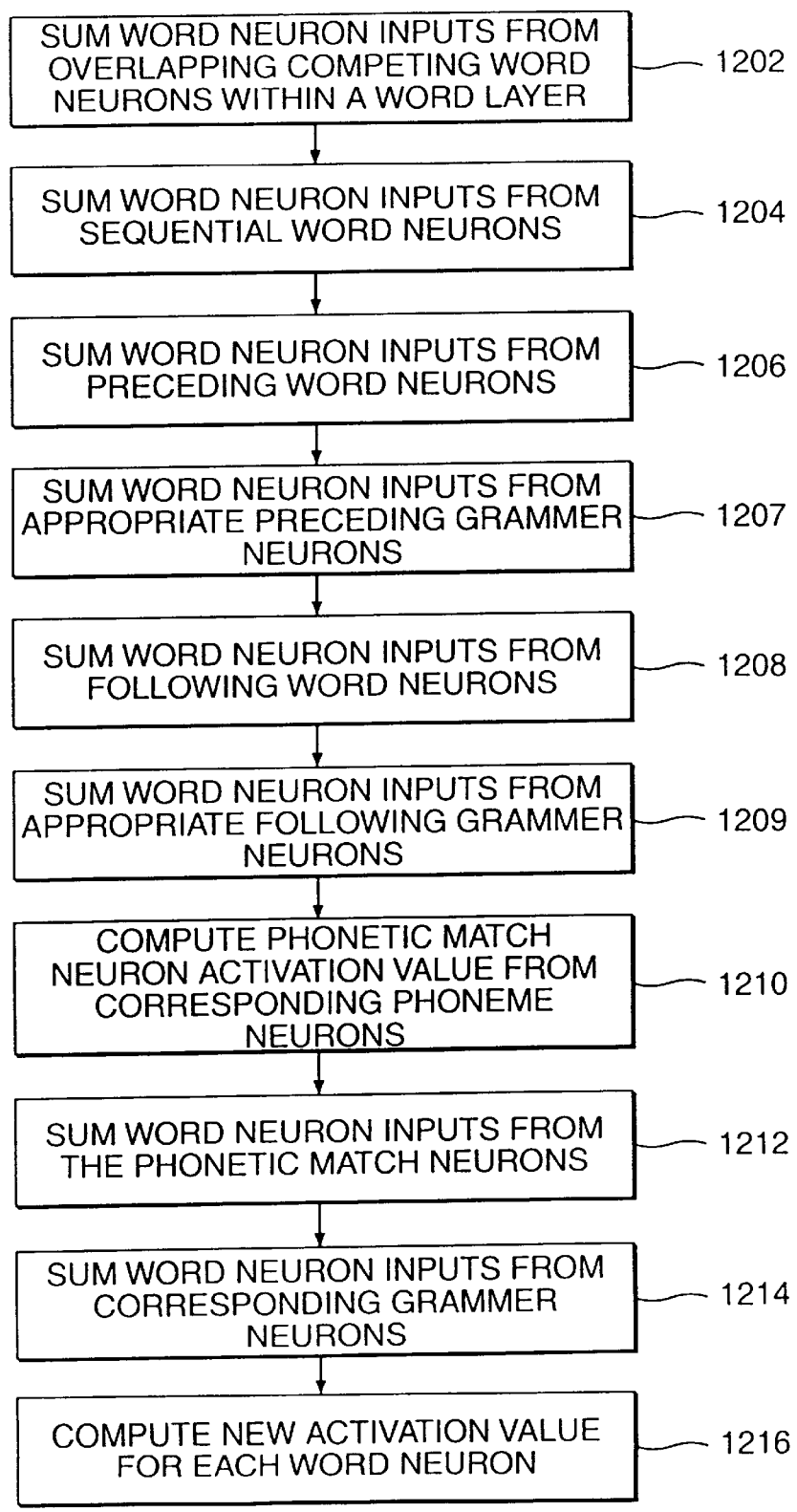
FIG. 12 is a flow diagram of a method for updating a word neuron activation value consistent with the present invention.

The flow diagram of FIG. 12 illustrates relaxation process substeps for updating a word neuron activation value. The relaxation process first sums word neuron inputs from overlapping competing word neurons within a word layer making up the neural network for each time step (step 1202) and sums the neuron inputs from sequential word neurons (step 1204). Next, additional sums are computed, the sum of neuron inputs from word neurons from neural networks corresponding to preceding time steps (step 1206), the sum of inputs from appropriate grammar neurons corresponding to preceding time steps (step 1207), the sum of neuron inputs from word neurons from neural networks corresponding to following time steps (step 1208), and the sum of inputs from appropriate grammar neurons corresponding to following time steps (step 1209). A phonetic match neuron filters phoneme neuron output before connecting to word neuron input. The phonetic match neuron activation value is computed for the possible (or expected) phoneme sequences for that word (step 1210) and sums the word neuron inputs from the phonetic match neurons (step 1212). The word neuron inputs from grammar neurons are summed (step 1214). A new activation value for each word neuron is computed from the sums calculated in steps 1202–1214 (step 1216).

As words become active in the word neural network layer, the activation value of word neurons are fed back to their constituent phonemes in the phoneme neural network layer. The activation value for a word neural network layer neuron is distributed among neurons corresponding to possible phonemes in the phoneme neural network layer associated with an active word. Active neurons in the word neural network layer inhibit the activation value of neurons in the phoneme neural network layer within the word neuron's temporal influence that are not part of an active word. For example, if phoneme neurons "j," "o," and "n" arc active, then the activation value for the neuron corresponding to the word "Jon" should be highly active. On the other hand, the activation value for the neuron corresponding to the word "Jan" should be somewhat active since two of its three neurons in the phoneme neural network layer are active. Feedback between the word neural network layer and the phoneme neural network layer allows the output of the neuron for the word "Jon" to inhibit the activation value for the neuron corresponding to the phoneme "a." The output of the neuron corresponding to the word "Jan," however. will not significantly inhibit the activation value for the neuron corresponding to the phoneme "o."

Figure 13:
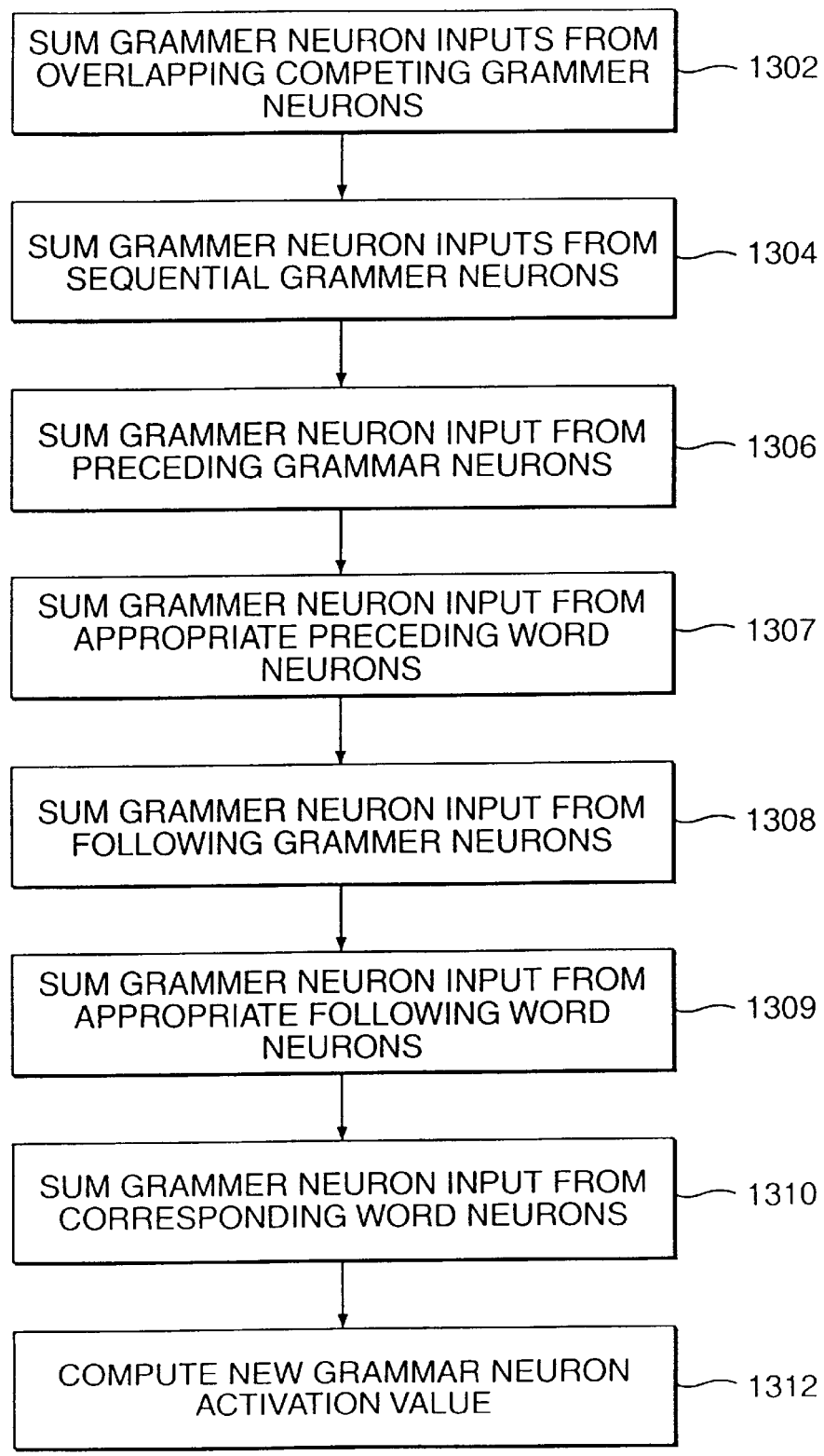
FIG. 13 is a flow diagram of a method for updating a grammar neuron activation value consistent with the present invention.

When a multilayer network consistent with the present invention includes a grammar neural network layer, the relaxation process updating the activation values of grammar neurons preferably follows the steps of the flow diagram of FIG. 13. The relaxation process for the grammar neural network layer sums the grammar neuron inputs from overlapping, competing neurons within a grammar layer making up the neural network for each time step (step 1302). The relaxation process sums the grammar neuron inputs from sequential grammar neurons (step 1304), sums the input from grammar neurons of neural networks corresponding to preceding time steps (step 1306), sums the input from appropriate word neurons corresponding to preceding time steps (step 1307), sums the input from grammar neurons of a neural network corresponding to following time steps (step 1308), sums the input from appropriate word neurons corresponding to following time steps (step 1309) and sums the grammar neuron inputs from corresponding word neurons (step 1310). A new grammar neuron activation value is computed from the sums calculated at steps 1302–1310 (step 1312).

When a multilayer network consistent with the present invention supports a large vocabulary, the computational demand imposed by updating all neuron activation values imposes a processing load that can hinder implementation of the classifier on low end microprocessors. Maintaining active lists and candidate lists that track a subset of the total number of neurons updated during classification can reduce the computational complexity. Preferably, neurons in the neural network that have an activation value that is greater than a threshold, for example, all neurons having a positive activation value, are listed on an active list. Alternatively, the top m neurons having an activation value that falls within a designated range can be placed on the active list.

Computational savings are achieved by using only the activation values of source neurons on the active list to update a target neuron. There is a separate active list for each time step for each of the word phoneme and/or grammar neural network layers. Computational savings are achieved because the active list limits the number of intralayer and interlayer updates. Moreover, an active list eliminates the need for constant searching for neurons with positive activation values.

A candidate list contains the target neurons to be updated. Initially all neurons can be members of the candidate list, but as relaxation proceeds over subsequent time steps, only neurons whose activations are above a selected threshold are maintained on the candidate list. The threshold is selected so that the candidate list contains neurons that have a meaningful influence on the classification outcome, and those neurons that do not contribute to the classification outcome are deleted from the candidate list. The threshold preferably falls in the range between –1 and 0. Additional computational savings are achieved by limiting and controlling the number of neuron updates.

Figure 14:
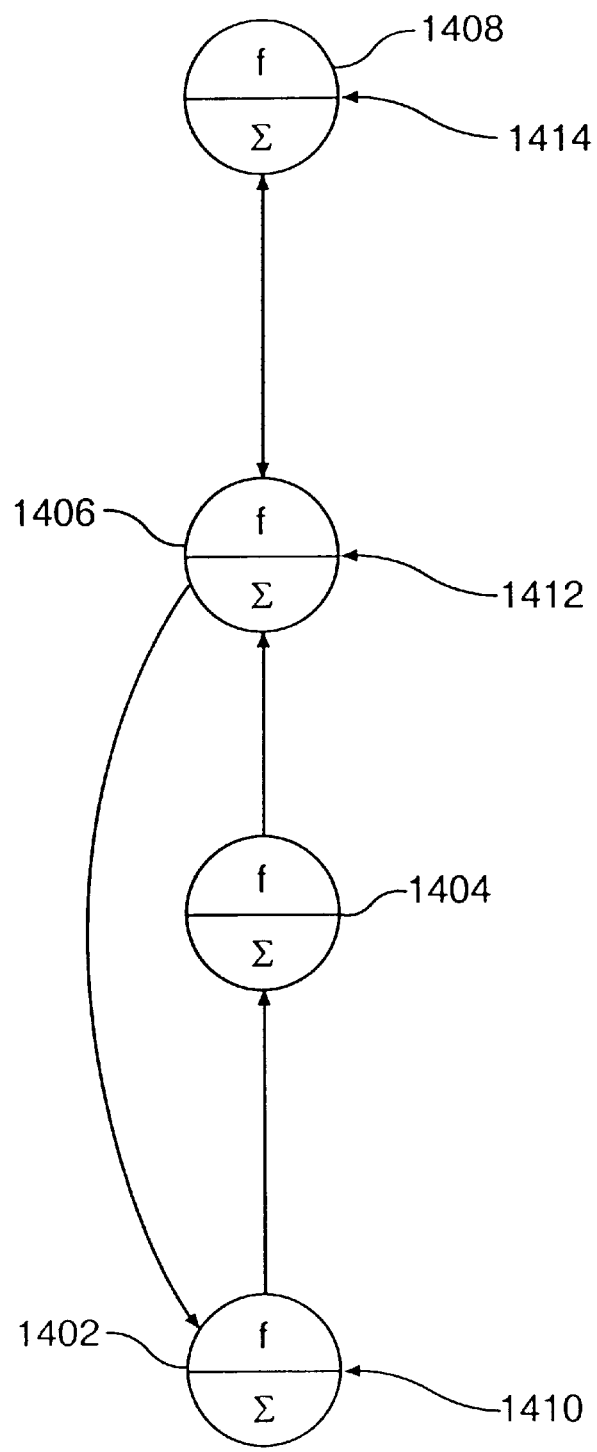
FIG. 14 is a block diagram of a single time step of a multilayer network consistent with the present invention.

FIG. 14 is a block diagram of another embodiment of a single time step of a multilayer network for classifying a spoken word consistent with the invention. This embodiment includes phoneme neuron 1402, phoneme match neuron 1404, word neuron 1406, grammar neuron 1408, phoneme context input 1410, word context input 1412, grammar context input 1414. Phoneme neuron 1402 receives context input 1410. Word neuron 1406 receives context input 1412. Grammar neuron 1408 receives context input 1414. The context inputs are responsive to contextual sequences of phonemes, words, and grammatical structures. Phoneme match neuron 1404 connects word neuron 1406 and phoneme neuron 1402, providing an intermediate nonlinear filter to discriminate, for example, between a fifty percent match of a two phoneme word and a fifty percent match of an eight phoneme word.

Figure 15:
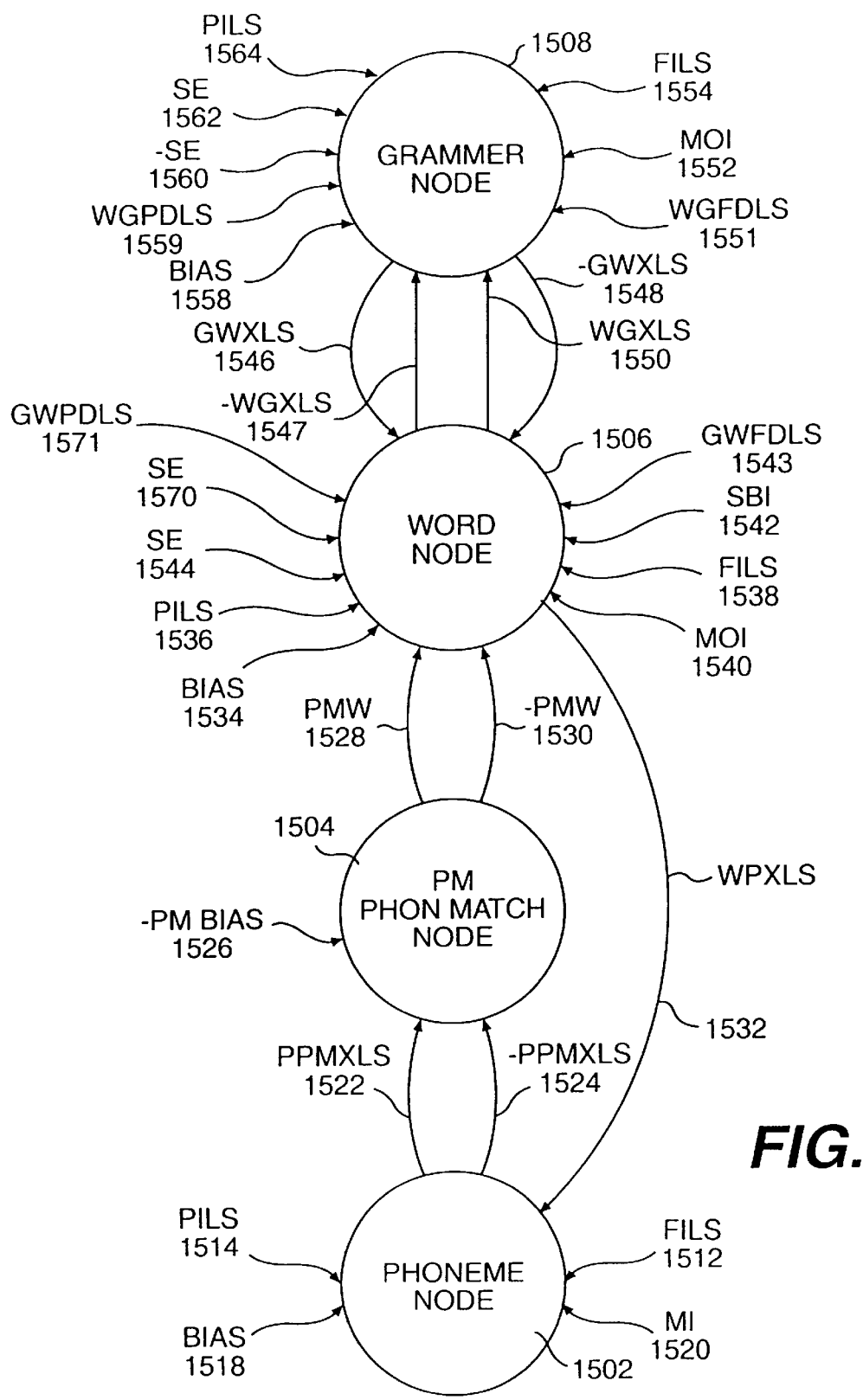
FIG. 15 is a block diagram of a single time step of a multilayer network consistent with the present invention.

FIG. 15 is a block diagram detailing the weight connections for a single time step of an embodiment of a multilayer network where phoneme neuron 1502, phone match neuron 1504, word neuron 1506, and grammar neuron 1508 receive multiple weighted inputs for classifying a spoken word consistent with the claims of the invention. In each case the weights represent conditional probabilities learned from neural network training based on libraries of words presented to the network.

Phoneme neuron 1502 receives a "follows intralayer synapse" (FILS) weight 1512 representing, the probability that the phoneme corresponding to phoneme neuron 1502 is followed by the phoneme corresponding to the phoneme neuron (not shown) connected to phoneme neuron 1502 through FILS weight 1512. Phoneme neuron 1502 also receives "precedes intralayer synapse" (PILS) through weight 1514. Bias weight 1518 provides an offset for the activation value of phoneme neuron 1502, and "mutual inhibition" (MI) weight 1520 inhibits the activation value of phoneme neuron 1502 based on the activation value of a connected phoneme neuron at the same time step (not shown). Phoneme neuron 1502 receives "word-to-phoneme extra layer synapse" (WPXLS) weight 1532 representing the probability that the phoneme represented by phoneme neuron 1502 is in the word corresponding to word neuron 1506 given the activation value of word neuron 1506.

Phoneme match neuron 1504 receives "phoneme-to-phoneme match neuron extra layer synapse" (PPMXLS) weight 1522 representing the probability that the phoneme represented by phoneme neuron 1502 is contained in the word represented by word neuron 1506. Phoneme match neuron 1504 also receives "not phoneme-to-phoneme match neuron extra layer synapse" (~PPMXLS) weight 1524 representing the probability that the constituent phoneme 1502 is not active. Phoneme match (PM) bias weight 1526 biases phoneme match neuron 1504.

Word neuron 1506 receives "phoneme match-to-word" (PMW) weight 1528 representing the probability that the combined activation of all of the phonemes of the word represented by word neuron 1506 is a positive value. Word neuron 1506 receives "not phoneme match-to-word" (~PMW) weight 1530 representing the probability that the combined activation of all of the phonemes of the word represented by word neuron 1506 is a negative value. Word neuron 1506 also receives bias weight 1534, PILS weight 1536, and FILS weight 1538. In addition to these weights, word neuron 1506 receives "mutual overlap inhibition (MOI)" weight 1540 representing the probability of classification overlap and degree of overlap among words. Silence between spoken words can aid word recognition. To exploit this silence a control process creates silence boundary markers that mark phonemes preceding or following silence. Consequently, the activation values of neurons of words that begin or end with phonemes that arc bordered by silence are increased and the activation values of neurons of words that have silence in the middle of the word are inhibited. "Silence boundary inhibition" (SBI) weight 1542 represents the probability that silence occurs in the middle of a word. "Sequential excitation" (SE) weight 1544 represents a probability that the activation of word neurons 1506 should be excited on the basis of temporal fit of preceding and following active word neurons. "Not sequential excitation" (~SE) weight 1570 represents the probability that the activation value of word neuron 1506 should be inhibited because of improper temporal word sequencing.

"Word-to-Grammar Diagonal Precedes Extra Layer Synapse" (WGPDLS) weight 1571 represents the probability that word neuron 1506 is preceded by the part of speech corresponding to the grammar neuron (not shown) connected to word neuron 1506 through WGPDLS weight 1571. "Word-to-Grammar Diagonal Follows Extra Layer Synapse" (WGFDLS) weight 1543 represents the probability that word neuron 1506 is followed by the part of speech corresponding to the grammar neuron (not shown) connected to word neuron 1506 through WGFDLS weight 1543.

"Grammar-to-word extra layer synapse" (GWXLS) weight 1546 and "not Grammar-to-word extra layer synapse" (~GWXLS) weight 1548 represent the probabilities that word neuron 1506 is active given that grammar neuron 1508 is or is not active, respectively.

Grammar neuron 1508 receives "word-to-grammar extra layer synapse" (WGXLS) weight 1550 representing the probability that the word corresponding to word neuron 1506 is the part of speech represented by grammar neuron 1508. Grammar neuron 1508 receives "not word-to-grammar extra layer synapse" input through weight 1547 representing the probability that the word corresponding to the word neuron 1506 is not the part of speech represented by grammar neuron 1508.

"Grammar-to-Word Diagonal Precedes Extra layer Synapse" (GWPDLS) weight 1559 represents the probability that grammar neurons 1508 is preceded by the word corresponding to the word neuron (not shown) connected to grammar neuron 1508 through GWPLS weight 1559. "Word-to-Grammar Diagonal Follows Extra Layer Synapse" (WGFDLS) weight 1551 represents the probability that grammar neuron 1508 is followed by the word corresponding to the word neuron (not shown) connected to the grammar neuron 1508 through WGFDLS weight 1551.

Grammar neuron 1508 also receives, FILS weight 1554, MOI weight 1552, bias weight 1558, ~SE weight 1560, SE weight 1562, and PILS weight 1564.

While some embodiments of the present invention using layers of neurons in a multilayer network have been shown and described, many types of nodes other than neurons may be substituted for, or used in combination with, neurons. For example, one skilled in the art will recognize that the layers of the multilayer network can include nodes that correspond to states in an HMM. Moreover, all of the layers can be constructed with HMM nodes or certain layers can include HMM nodes while other layers include neurons. Accordingly a multilayer network can include layers of multiple types of nodes selected according to application requirements.

Figure 16:
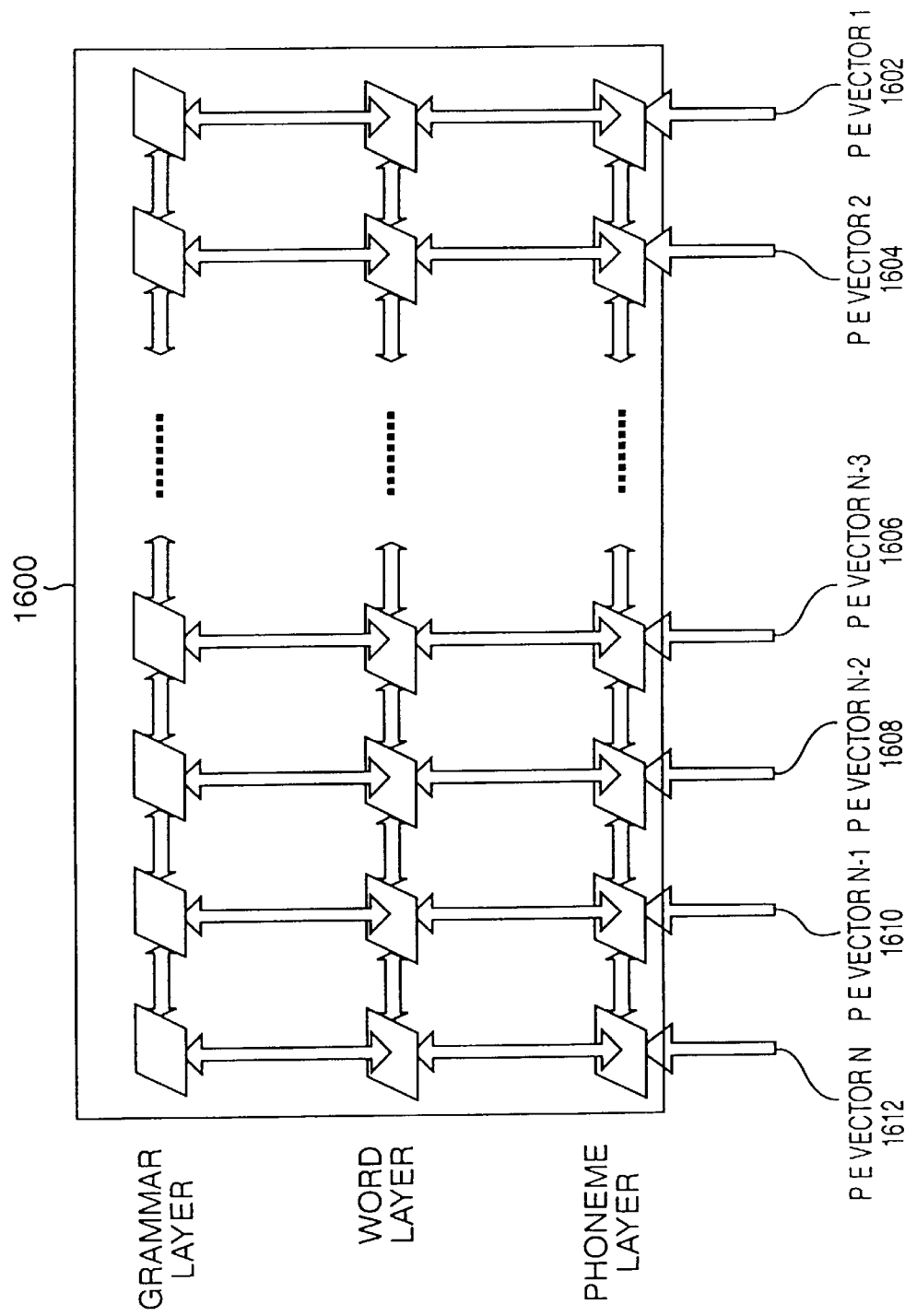
FIG. 16 is a block diagram of a multilayer network for parallel operation consistent with the present invention.

FIG. 16 is a block diagram of a multilayer network 1600 consistent with the present invention configured for parallel temporal operation. In FIG. 16 input vectors 1 through N (1602 through 1612), representing an entire phrase of speech, are processed by interconnected phoneme layers simultaneously. The multilayer network is relaxed until a word classification is determined.

Other embodiments of a multilayer network consistent with the present invention also recognize handwriting, forecast the weather, identify images, and control processes.

This list is representative and is not intended to exhaust the many applications consistent with the scope of the present invention.

Figure 17:
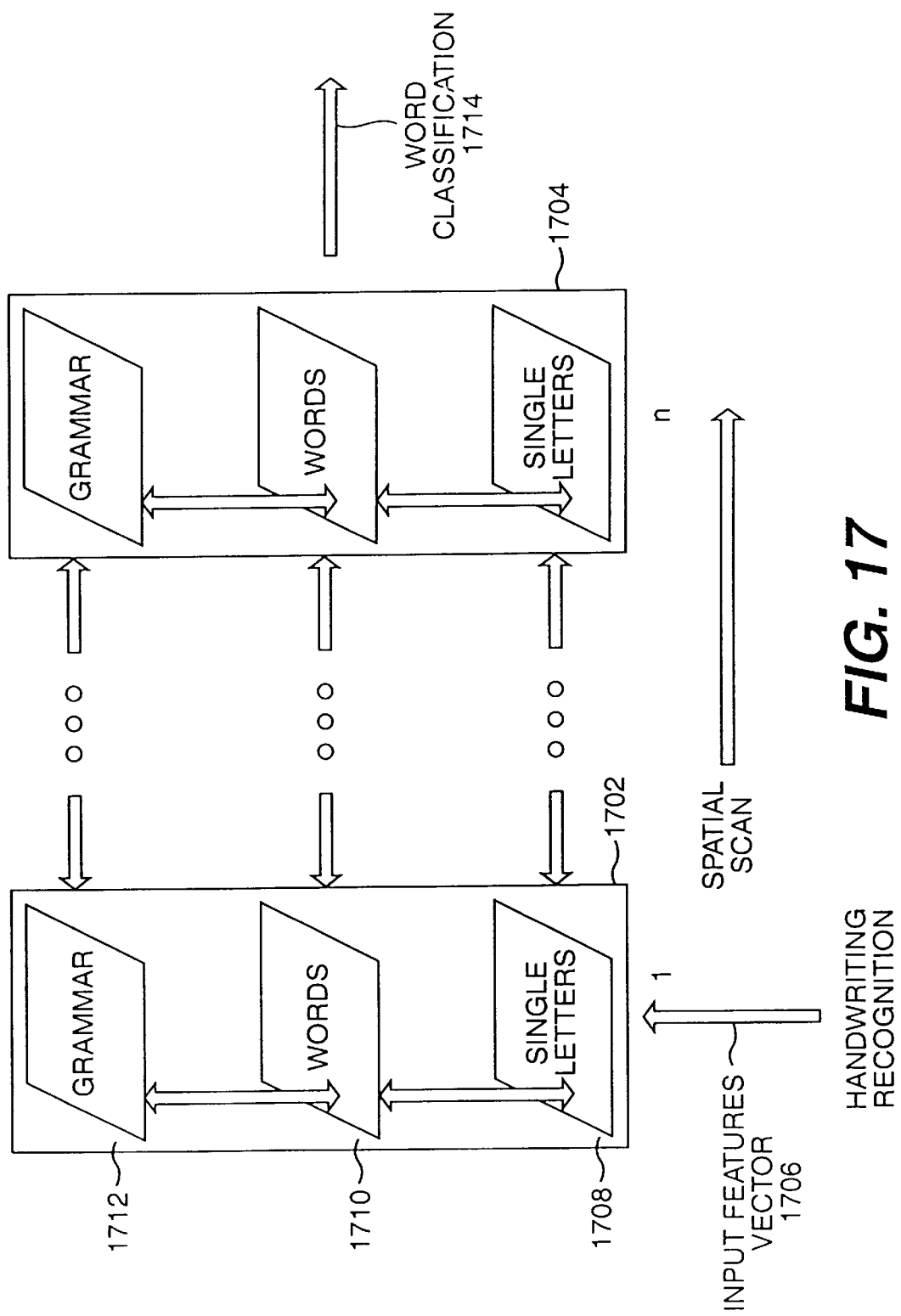
FIG. 17 is a block diagram of a multilayer network for handwriting recognition consistent with the present invention.

FIG. 17 is a block diagram of a multilayer network for classifying a signal representing an image of handwritten text. FIG. 17 includes multilayer network 1702 for spatial scan 1 and multilayer network 1704 for spatial scan n. Each spatial scan corresponds to a scan interval of pixels in a digital image, for example, an array of pixels corresponding to a single letter. Each scan is preprocessed to produce input feature vector 1706, for example, a vector of letter probability estimates. Multilayer network 1702 includes layer 1708 for classifying single letters layer 1710 for classifying words, and layer 1712 provides grammatical context for classifying the handwritten text.

Layer 1708 produces estimates corresponding to the probability that input feature vector 1706 represents a given letter. Layer 1708 produces these estimates using preceding and following feature context, intralayer context, and context from Layer 1710. layer 1710 produces estimates corresponding to the probability that the letter estimates produced by layer 1708 represent a particular word. Layer 1710 produces estimates using preceding and following feature context, intralayer context, and context from both layer 1708 and layer 1712. Layer 1712 provides grammar constraint information to layer 1710. This constraint information is refined by following and preceding feature context from nodes in layer 1712 and estimates produced by layer 1710.

After several scan intervals, multilayer network 1702 corresponding to scan interval 1 through multilayer network 1704 corresponding to scan interval n relax to produce word classification 1714. Word classification continues until all of the digitized image of handwritten text has been scanned.

Figure 18:
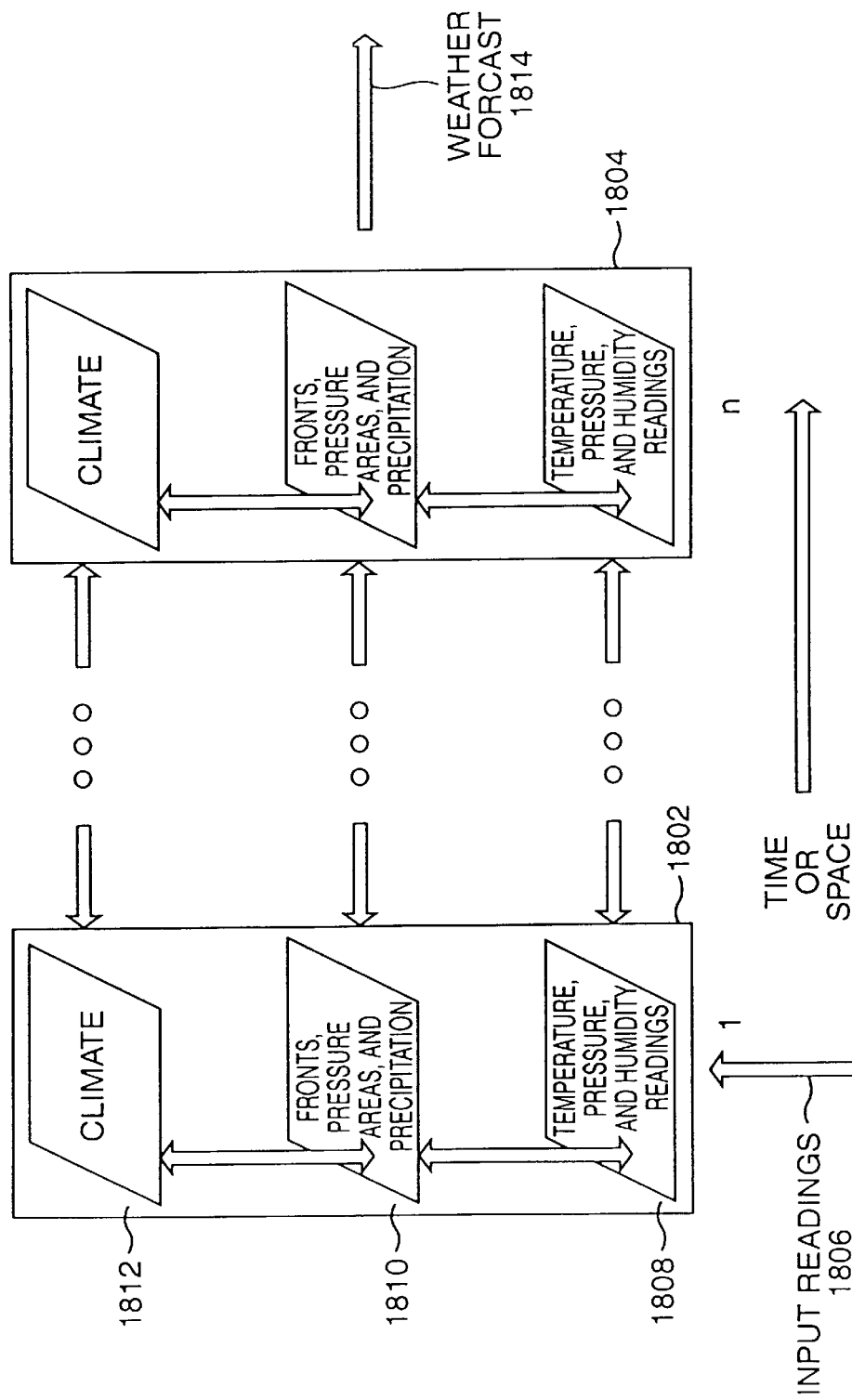
FIG. 18 is a block diagram of a multilayer network for weather forecasting consistent with the present invention.

FIG. 18 is a block diagram of a multilayer network for weather forecasting. FIG. 18 includes multilayer network 1802 for time or space interval 1 and multilayer network 1804 for interval n. Input readings 1806 are received by layer 1808. These reading are, for example, a sequence of feature vectors of weather variables representing temperature, pressure, and humidity. During each interval of time or space the input readings correspond to a land mass area. Where the intervals between multilayer networks represent time intervals, the reading locations are fixed and readings are taken at successive time steps. Where the intervals between multilayer networks represent a spatial interval, time is fixed and the readings are taken at different locations, e.g., at locations along a weather front.

Layer 1808 resolves ambiguity in input readings 1806 using preceding and following context, intralayer context, and weather pattern context from layer 1810. Layer 1810 produces estimates of weather patterns from the values of nodes in layer 1808, weather pattern models, intralayer context, and climate constraints imposed by layer 1812. Layer 1812 imposes climatic constraints on the estimates produced by layer 1810. The climatic constraints embodied in layer 1812 are refined over successive intervals by intralayer context, following and preceding context, and context from layer 1810.

After several intervals, multilayer network 1802 corresponding to interval 1 through multilayer network 1804 corresponding to interval n relax to produce weather forecast 1814.

Figure 19:
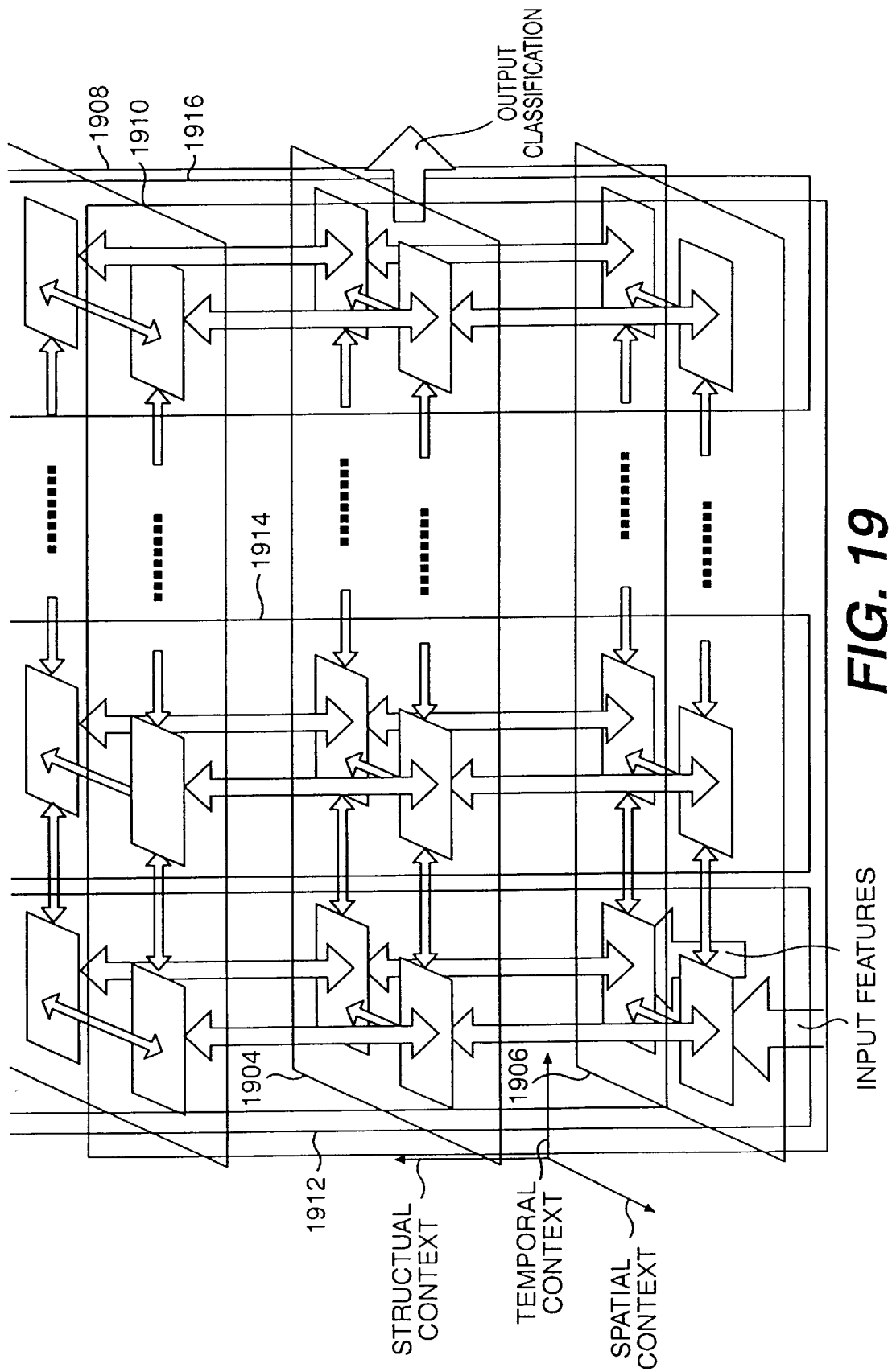
FIG. 19 is a block diagram of a multilayer network with spatial and temporal interaction consistent with the present invention.

FIG. 19 is a block diagram of a multilayer network consistent with the present invention configured to allow simultaneous interaction between spatial and temporal contexts such as might used in a large scale weather forecasting system. Spatial context networks 1908 and 1910 correspond to geographic areas (only two are shown to simplify the figure, more can be used). Structural context layers 1902, 1904, and 1906 are, for example, the layers in FIG. 17. Multilayer networks 1912, 1914, and 1916 represent different time steps. The multilayer networks would preferably time step in parallel.

Figure 20:
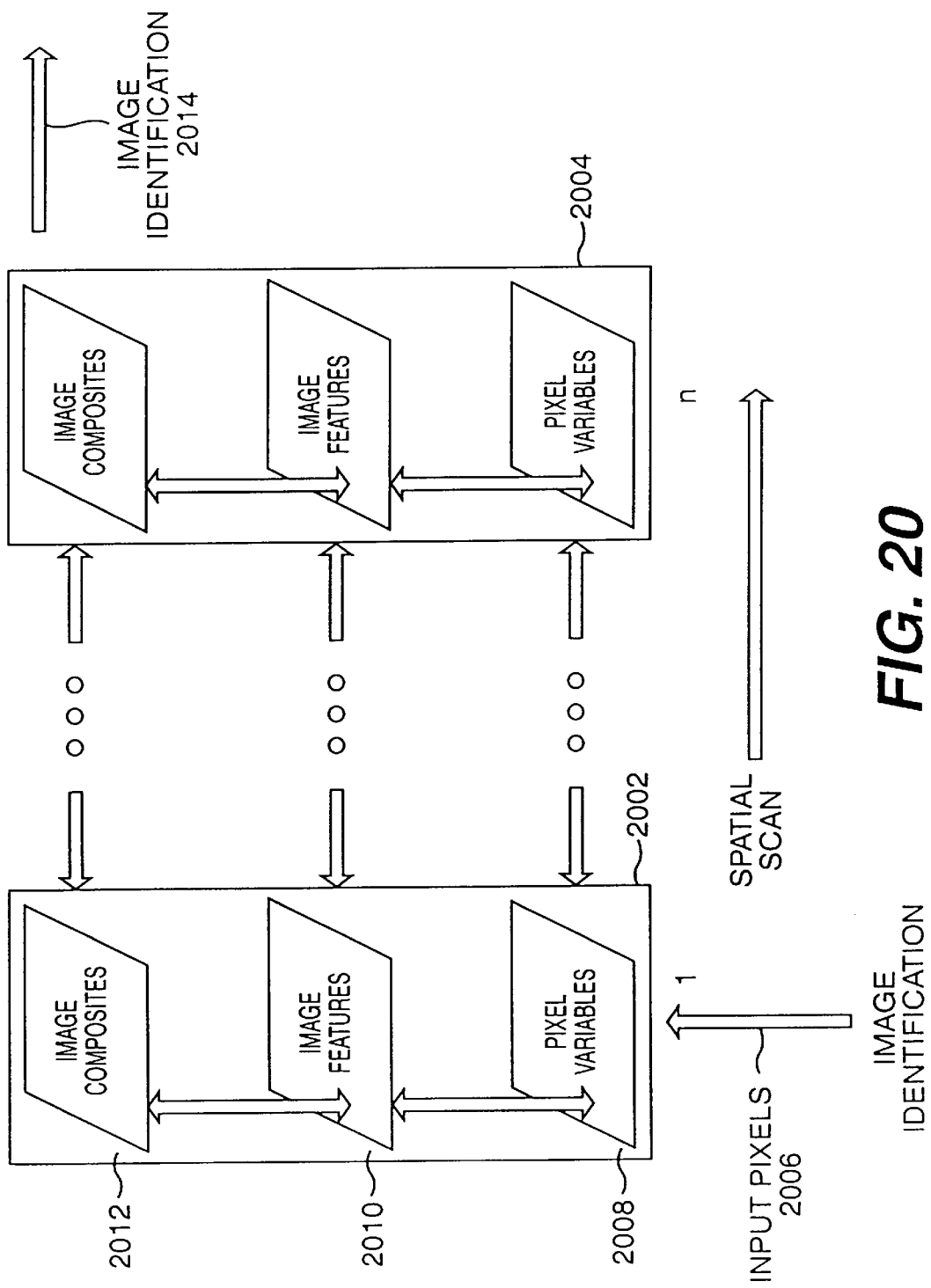
FIG. 20 is a block diagram of a multilayer network for image identification consistent with the present invention.

FIG. 20 is a block diagram of a multilayer network for identifying images, such as faces, shapes, and other objects. FIG. 20 includes multilayer network 2002 for spatial interval 1 and multilayer network 2004 for interval n. Input pixels 2006 from a digitized image are received by layer 2008. Layer 2008 preprocesses, e.g., enhances the contrast, detects edges, filters, etc., the input pixels Using preceding and following context, intralayer context, and context from layer 2010. Layer 2010 estimates image features from pixels processed by layer 2008, preceding and following context, and image composite estimates produced by layer 2012.

The image composites produced by layer 2012 are estimates of how different image features form different objects in an image. The composite estimates are refined through successive steps of receiving input pixels 2006, relaxation interactions among layers within a multilayer network for a spatial interval, and relaxation interactions among temporal multilayer networks representing different spatial intervals. Once input pixels 2006 corresponding to the object in the image have been processed by the multilayer network, multilayer network 2004 outputs image identification 2014.

Figure 21:
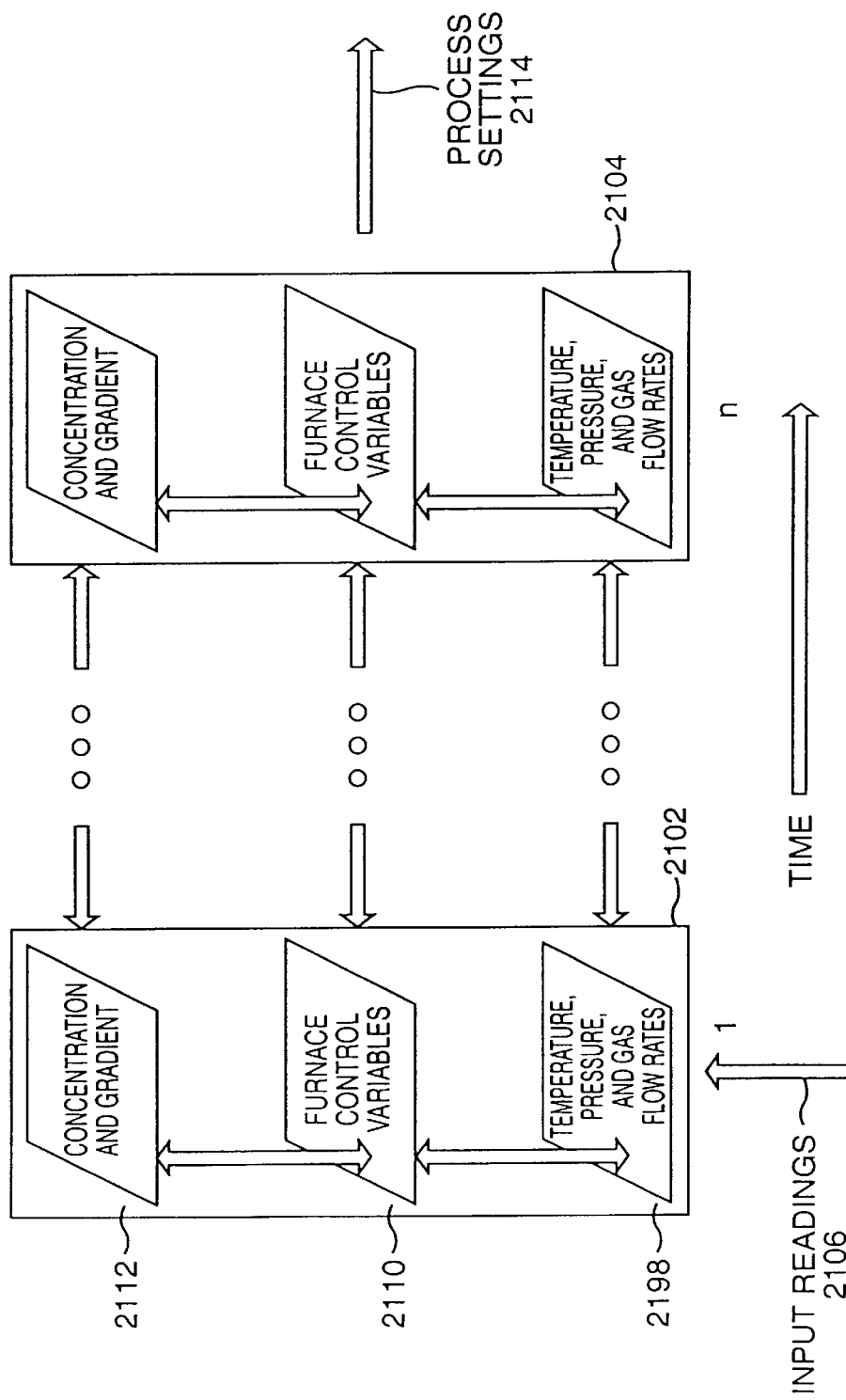
FIG. 21 is a block diagram of a multilayer network for semiconductor diffusion furnace control consistent with the present invention.

FIG. 21 is a block diagram of a multilayer network for controlling a process, such as a semiconductor diffusion furnace. FIG. 21 includes multilayer network 2102 for time interval 1 and multilayer network 2104 for interval n. Input readings 2106 are received by layer 2102. Input readings 2106 correspond to, for example, primary process control variables. Layer 2110 processes the input readings using preceding and following context, intralayer context, and context information from layer 2110. Layer 2110 produces estimates of furnace control variables using variable definitions, variable relationships preceding and following context, and context from layer 2112. Furnace control variables are higher level process control parameters derived from lower level primary process control variables such as temperature, pressure, and gas flow rates.

Layer 2112 imposes constraints on the process settings derived from process targets, such as dopant concentrations and gradients. Multilayer network 2104 periodically outputs process settings 2114 to control the semiconductor diffusion furnace.

CONCLUSION

The first layer of a multilayer network receives an ordered sequence of input signal feature vectors, that can also be referred to as classification variables, which estimate input signal content for defined intervals and outputs through a second layer an ordered sequence of decision variables represented by neuron activation values, corresponding, to specific groupings of the input classification variables. At the beginning of an input cycle, activation values of neurons in the layers of the multilayer network are moved forward one time step and first layer neurons at the beginning time step are initialized by an input signal feature vector. A relaxation process is next applied in which neurons at each time step interact with other neurons at the same time step and at preceding and following time steps. Interactions occur both within layers and between layers. The relaxation process iteratively refines the classification variables' initial estimate of the input signal contents and evolves the neuron activation values representing decision variables. The relaxation process contains several relaxation cycles during which all neurons in the network are partially updated. The multilayer network generates a classification when a neuron activation value meets established decision criteria.

A multilayer network consistent with the present invention includes a first neural network layer that receives a sequence of input classification variables and a second neural network layer consisting of neurons that have activation values representing decision variables based on a particular context of first layer classification variables. Additional neural network layers representing higher level contextual information can be added to the first and second layers to improve classification results. Since multiple time steps are used to classify input to the multilayer network, each neural network is replicated to correspond to the number of time steps. The multilayer neural network also includes structure implementing a relaxation process that updates the activation values of neurons in the neural network layers both within a time step and across multiple time steps.

While some embodiments have been described, various changes and modifications may be made, and equivalents may be substituted. In addition, many modifications may be made to adapt a particular element, technique or implementation to the teachings of the present invention without departing from the central scope of the invention. For example, disclosed elements may be implemented in hardware, computer program code, or a combination of both hardware and computer program code. Moreover, elements depicted and described separately may be combined and implemented in a single element. Therefore, this invention is not limited to the particular embodiments and methods disclosed, but includes all embodiments falling within the scope of the appended claims.

We claim:

1. A method for classifying a signal using a multilayer temporal relaxation network comprising the steps of:

receiving an input signal feature vector in a first layer;

applying a multilayer relaxation process that updates an activation value of a node in the multilayer network for a current time step;

providing interaction between multilayer relaxation networks, wherein each multilayer relaxation network represents a step in time;

determining whether there is a candidate classification for the current time step in a second layer;

outputting the candidate classification for the current time step; and incrementing the current time step.

2. The method of claim 1, wherein the step of applying a multilayer relaxation process includes the substep of computing an activation value according to an activation function $f(t)$, where $f(t)=k_0(t+1)-1$, when $t<-1$; $-k_1 L((-t/k_2)-2)+k_3$, when $-1 \leq t<0$; $0$ when $t=0$; $k_1 L((t/k_2)-2)-k_3$, when $0<t \leq 1$; and $k_0(t-1)+1$, when $t>1$; wherein operator $L(t)=1/(1+e^{-2t})$ and $k_0, k_1, k_2,$ and $k_3$ are scaling constants.

3. The method of claim 1, wherein the step of applying a multilayer relaxation process includes the substep of computing an activation value according to an activation function representing scaled and translated logistic functions combined to produce a flat response near the middle of the activation function domain and a linear response in a clamping region.

4. The method of claim 1, wherein the step of applying a multilayer relaxation process includes the substep of:

updating said activation value through a controlled sequence of partial updates.

5. A method for classifying a signal representing spoken sounds using a multilayer temporal relaxation network comprising the steps of:

receiving in a first layer, having a plurality of interconnected phoneme nodes with associated activation values, an input signal feature vector representing a phoneme included in said spoken sounds;

applying a multilayer relaxation process for a current time step, wherein the multilayer relaxation process updates selected ones of the activation values for the phoneme nodes and updates selected ones of activation values associated with a plurality of word nodes in a second layer;

providing interaction between multilayer relaxation networks, wherein each multilayer relaxation network represents a step in time; and outputting a word in the current time step.

6. The method of claim 5, wherein the step of applying a multilayer relaxation process further includes the substep of:

updating in a third layer, having a plurality of interconnected grammar nodes with associated activation values, selected ones of the grammar node activation values.

7. The method of claim 6, wherein the step of updating a grammar node activation value includes the substeps of:

summing grammar node inputs from competing nodes in said third layer;

summing grammar node inputs from sequential word nodes in said second layer;

summing grammar node inputs from grammar nodes in a preceding time step;

summing grammar node inputs from grammar nodes in a following time step;

summing grammar node inputs from word nodes; and computing an activation value for a grammar node.

8. The method of claim 7, further comprising the step of:

modifying an active grammar list according to the computed grammar node activation value.

9. The method of claim 5, wherein the step of applying a multilayer relaxation process includes the substeps of:

summing phoneme node inputs from competing nodes within said first layer;

updating selected ones of the phoneme activation values based on an input from a phoneme node in a preceding time step;

updating selected ones of the phoneme activation values based on an input from a phoneme node in a following time step;

summing phoneme node inputs from nodes in said second layer corresponding to active words; and computing an activation value of a phoneme node.

10. The method of claim 5, wherein the step of applying a multilayer relaxation process that updates the phoneme node activation value and updates the word node activation value includes the substeps of:

summing word node inputs from competing word nodes within said second layer;

summing word node inputs from sequential word nodes within said second layer;

summing word node inputs from word nodes in a preceding time step;

summing word node inputs from word nodes in a following time step;

summing word node inputs from phoneme match nodes; and computing an activation value for a word node.

11. The method of claim 10, further including the step of summing word node inputs from a grammar node in a third layer.

12. The method of claim 5, wherein the step of outputting the candidate word further includes the substep of outputting the candidate word from an active word list.

13. The method of claim 5, wherein the step of applying a multilayer relaxation process includes the substep of:

updating said selected ones of the activation values through a controlled sequence of partial updates.

14. A method for classifying an image of handwritten text using a multilayer temporal relaxation network comprising the steps of:

receiving in a first layer an input image feature vector;

applying a multilayer relaxation process that updates an activation value of a node in the multilayer network for a current spatial scan interval;

determining whether there is a candidate classification of the image of handwritten text for the current spatial scan interval in a second layer;

providing interaction between multilayer relaxation networks, wherein each multilayer relaxation network represents a step in time;

outputting the candidate classification for the current spatial scan interval; and incrementing the current spatial scan interval.

15. A method for forecasting weather using a multilayer temporal relaxation network comprising the steps of:

receiving in a first layer an input reading corresponding to a weather variable;

updating an activation value of a node in the multilayer network for a current time or spatial interval using multilayer relaxation;

providing interaction between multilayer relaxation networks, wherein each multilayer relaxation network represents a spatial scan interval;

determining whether there is a candidate weather forecast for the current time or spatial interval in a second layer;

outputting the candidate weather forecast for the current time or spatial interval; and incrementing the current time or spatial interval.

16. A method for identifying an image using a multilayer temporal relaxation network comprising the steps of:

receiving in a first layer an input pixel from said image;

updating an activation value of a node in the multilayer network for a current spatial scan interval using multilayer relaxation;

providing interaction between multilayer relaxation networks, wherein each multilayer relaxation network represents a step in time;

determining whether there is a candidate identification for the current spatial scan interval in a second layer;

outputting the candidate identification for the current spatial scan interval; and incrementing the current spatial scan interval.

17. A method for controlling a process using a multilayer temporal relaxation network comprising the steps of:

receiving in a first layer an input reading corresponding to a process control parameter;

updating an activation value of a node in the multilayer network for a current time interval using multilayer relaxation;

determining whether there is a candidate control level for the current time interval in a second layer;

providing interaction between multilayer relaxation networks, wherein each multilayer relaxation network represents a step in time;

outputting the candidate control level for the current time interval; and incrementing the current time interval.

18. A method for classifying a signal using a multilayer relaxation network comprising the steps of:

receiving an input signal feature vector in a first layer;

applying a relaxation process that updates an activation value of a node in the multilayer network for a current time step, wherein the step of applying a relaxation process includes the substep of computing an activation value according to an activation function $f(t)$, where $f(t)=k_0(t+1)-1$, when $t<-1$; $-k_1L((-t/k_2)-2)+k_3$, when $-1\leq t<0$; $0$ when $t=0$; $k_1L((t/k_2)-2)-k_3$, when $0<t\leq 1$; and $k_0(t-1)+1$, when $t>1$; wherein operator $L(t)=1/(1+e^{-2t})$ and $k_0$, $k_1$, $k_2$, and $k_3$ are scaling constants;

determining whether there is a candidate classification for the current time step in a second layer;

outputting the candidate classification for the current time step; and incrementing the current time step.

19. A method for classifying a signal using a multilayer relaxation network comprising the steps of:

receiving an input signal feature vector in a first layer;

applying a relaxation process that updates an activation value of a node in the multilayer network for a current time step, wherein the step of applying a relaxation process includes the substep of computing an activation value according to an activation function representing scaled and translated logistic functions combined to produce a flat response near the middle of the activation function domain and a linear response in a clamping region;

determining whether there is a candidate classification for the current time step in a second layer;

outputting the candidate classification for the current time step; and incrementing the current time step.

20. A multilayer temporal relaxation network apparatus for signal classification comprising:

an input layer, having a first plurality of nodes with associated activation values, for receiving an input signal feature vector representing an input signal and for classifying at least part of said input signal according to a first signal feature;

a context layer, having a second plurality of nodes with associated activation values, for classifying at least part of said input signal according to a second signal feature, the second signal feature representing a context of said input signal;

means for providing interaction between said input layer and said context layer to update selected ones of the activation values for the nodes in said input layer and said context layer during classification, wherein said means for providing interaction includes relaxation means for updating said selected ones of the activation values through a controlled sequence of partial updates;

means for providing interaction between multilayer relaxation networks, wherein each multilayer relaxation network represents a step in time; and means for generating a signal classification for said input signal from said input layer or said second context layer.

21. A multilayer temporal relaxation network apparatus for classifying a signal representing spoken sounds comprising:
  a first layer, having a plurality of phoneme nodes with associated activation values, for receiving an input signal feature vector representing an input signal associated with the spoken sounds and for classifying at least a portion of said spoken sounds as one of a plurality of possible phonemes;
  a second layer, having a plurality of word nodes with associated activation values, for classifying said spoken sounds as one of a plurality of possible words;
  means for providing multilayer relaxation interaction between said first and second layers to update selected ones of the activation values for phoneme nodes and word nodes;
  means for providing interaction between multilayer relaxation networks, wherein each multilayer relaxation network represents a step in time; and
  means for classifying said spoken sounds according to selected ones of the activation values in said first layer or according to selected ones of the activation values in said second layer.

22. The apparatus of claim 21, wherein said first layer further includes
  a phoneme node for each of the possible phonemes;
  wherein said second layer further includes a word node for each word in a vocabulary; and
  wherein said means for providing multilayer relaxation interaction further includes interconnections among phoneme nodes and word nodes.

23. The apparatus of claim 21, wherein said phoneme nodes and said word nodes include means for receiving inhibition input, activation input, and a bias value for controlling an activation value for each phoneme node and word node.

24. The apparatus of claim 23, further comprising an intermediate activation node connected between a phoneme node and a word node.

25. The apparatus of claim 21, further comprising:
  a third layer, having a plurality of grammar nodes with associated activation values, for associating a grammatical part of speech with said word classified by said second layer;
  means for providing interaction between said second and third layers to update selected ones of the word node activation values and grammar node activation values; and
  means for classifying said spoken sounds according to selected ones of said phoneme node activation values, said word node activation values, or said grammar node activation values.

26. The apparatus of claim 25, further including:
  means for providing interaction between multilayer networks, each representing a different step of time.

27. The apparatus of claim 25, wherein said first layer further includes a phoneme node for each one of the possible phonemes;
  wherein said second layer further includes a word node for each word in a vocabulary;
  wherein said third layer further includes a grammar node for each grammatical part of speech;
  wherein said means for providing multilayer relaxation interaction between said first and second layers further includes interconnections among phoneme nodes and word nodes; and
  wherein said means for providing interaction between said second and third layers further comprises interconnections among word nodes and grammar nodes.

28. A multilayer temporal relaxation network apparatus for classifying a signal representing spoken sounds comprising:
  a first layer of interconnected phoneme nodes, wherein each phoneme node has an activation value responsive to an input signal feature vector;
  a second layer of interconnected word nodes connected to said phoneme nodes of said first layer, wherein each word node has an activation value responsive to a sequence of active phoneme nodes; and
  means for providing interaction between multilayer relaxation networks, wherein each multilayer relaxation network represents a step in time.

29. The apparatus of claim 28, further comprising:
  a phoneme match node connected between a phoneme node of said first layer and a word node of said second layer.

30. The apparatus of claim 28, further comprising:
  a third layer of interconnected grammar nodes, wherein each grammar node has an activation value responsive to a sequence of active word nodes.

31. An apparatus for classifying a signal using a multilayer temporal relaxation network comprising:
  means for receiving an input signal feature vector;
  means for applying a multilayer relaxation process that updates an activation value of a node in the multilayer network for a current time step;
  means for providing interaction between multilayer relaxation networks, wherein each multilayer relaxation network represents a step in time; and
  means for outputting a classification.

32. A multilayer relaxation apparatus for classifying a signal comprising:
  a first multilayer network representing a first time step, said first multilayer network including a first layer and a second layer;
  a second multilayer network representing a second time step, said second multilayer network including a first layer and a second layer;
  means for relaxing said first multilayer network connecting said first and second layers of said first multilayer network;
  means for relaxing said second multilayer network connecting said first and second layers of said second multilayer network;
  means for relaxing said first and second multilayer networks together; and
  means for classifying said signal after relaxing said first and second multilayer networks.

33. A multilayer relaxation apparatus for classifying a signal comprising:
  a first multilayer neural network representing a first time step, said first multilayer neural network including a first neural network layer and a second neural network layer;
  a second multilayer neural network representing a second time step, said second multilayer neural network including a first neural network layer and a second neural network layer;

means for relaxing said first multilayer neural network connecting said first and second neural network layers of said first multilayer neural network;

means for relaxing said second multilayer neural network connecting said first and second neural network layers of said second multilayer neural network;

means for relaxing said first and second multilayer neural networks together; and means for classifying said signal after relaxing said first and second multilayer neural networks.

34. A multilayer temporal relaxation network apparatus for classifying a signal representing spoken sounds comprising:

a first layer having a plurality of phoneme nodes with associated activation values, for receiving an input signal feature vector representing an input signal associated with the spoken sounds and for classifying at least a portion of said spoken sounds as one of a plurality of possible phonemes;

a second layer having a plurality of word nodes with associated activation values, for classifying said spoken sounds;

means for providing multilayer relaxation interaction between said first and second layers to update selected ones of the activation values for phoneme nodes and word nodes;

a third layer having a plurality of grammar nodes with associated activation values, for associating a grammatical part of speech with said spoken sounds classified by said second layer;

means for providing multilayer relaxation interaction between said second and third layers to update selected ones of the word node activation values and selected ones of the grammar node activation values;

means for providing interaction between multilayer relaxation networks, wherein each multilayer relaxation network represents a step in time;

means for classifying said spoken sounds according to selected ones of the activation values of the phoneme nodes, word nodes, or grammar nodes; and a phoneme match node connecting said first layer and said second layer.

35. A multilayer temporal relaxation network apparatus for signal classification comprising:

an input layer, having a first plurality of nodes with associated activation values, for receiving an input signal feature vector representing an input signal and for classifying at least part of said input signal according to a first signal feature;

a context layer, having a second plurality of nodes with associated activation values, for classifying at least part of said input signal according to a second signal feature, the second signal feature representing a context of said input signal;

means for providing multilayer relaxation interaction between said input layer and said context layer to update selected ones of the activation values for the nodes in said input layer and said context layer during classification; and means for providing interaction between multilayer relaxation networks, wherein each multilayer relaxation network represents a step in time; and means for generating a signal classification for said input signal from said input layer or said second context layer.

36. The apparatus of claim 35, further comprising:

a third layer, having a third plurality of nodes with associated activation values, for classifying a third signal feature representing an additional context of said input signal;

means for providing interaction between said context layer and said third layer to update selected ones of the activation values in said context layer and said third layer; and wherein the means for generating a signal classification includes means for generating a signal classification from said second or third signal features according to the activation value of one of the nodes in said context layer or said third layer.

37. The apparatus of claim 36, further including:

means for providing interaction between multilayer networks, each representing a different step of time.

38. The apparatus of claim 35, wherein said input layer or said context layer includes a node with an activation function $f(t)$, where $f(t)=k_0(t+1)-1$, when $t<-1$; $-k_1L((-t/k_2)-2)+k_3$, when $-1 \leq t<0$; $0$ when $t=0$; $k_1L((t/k_2)-2)-k_3$, when $0<t \leq 1$; and $k_0(t-1)+1$, when $t>1$; wherein operator $L(t)=1/(1+e^{-2t})$ and $k_0$, $k_1$, $k_2$, and $k_3$ are scaling constants.

39. The apparatus of claim 35, wherein said input layer or said context layer includes a node with an activation function representing scaled and translated logistic functions combined to produce a flat response near the middle of the activation function domain and a linear response in a clamping region.

40. A multilayer relaxation network apparatus for signal classification comprising:

an input layer, having a first plurality of nodes with associated activation values, for receiving an input signal feature vector representing an input signal and for classifying at least part of said input signal according to a first signal feature;

a context layer, having a second plurality of nodes with associated activation values, for classifying at least part of said input signal according to a second signal feature, the second signal feature representing a context of said input signal, wherein said input layer or said context layer includes a node with an activation function $f(t)$, where $f(t)=k_0(t+1)-1$, when $t<-1$; $-k_1L((-t/k_2)-2)+k_3$, when $-1 \leq t<0$; $0$ when $t=0$; $k_1L((t/k_2)-2)-k_3$, when $0<t \leq 1$; and $k_0(t-1)+1$, when $t>1$; wherein operator $L(t)=1/(1+e^{-2t})$ and $k_0$, $k_1$, $k_2$, and $k_3$ are scaling constants;

means for providing interaction between said input layer and said context layer to update selected ones of the activation values for the nodes in said input layer and said context layer during classification; and means for generating a signal classification for said input signal from said input layer or said second context layer.

41. A multilayer relaxation network apparatus for signal classification comprising:

an input layer, having a first plurality of nodes with associated activation values, for receiving an input signal feature vector representing an input signal and for classifying at least part of said input signal according to a first signal feature;

a context layer, having a second plurality of nodes with associated activation values, for classifying at least part of said input signal according to a second signal feature, the second signal feature representing a context of said input signal, wherein said input layer or said context layer includes a node with an activation function representing scaled and translated logistic functions combined to produce a flat response near the middle of the activation function domain and a linear response in a clamping region;

means for providing interaction between said input layer and said context layer to update selected ones of the activation values for the nodes in said input layer and said context layer during classification; and means for generating a signal classification for said input signal from said input layer or said second context layer.

42. A computer program product for use in a computer adapted for classifying a signal, the computer program product comprising a computer readable medium for storing computer readable code means, which when executed by a the computer, enables the computer to classify a signal, and wherein the computer readable code means includes computer readable instructions for causing the computer to execute a method comprising the steps of:

receiving an input signal feature vector in a first layer of a multilayer network;

updating an activation value of a node in the multilayer network for a current time step using multilayer relaxation;

providing interaction between multilayer relaxation networks, wherein each multilayer relaxation network represents a step in time;

determining whether there is a candidate classification for the current time step in a second layer;

outputting the candidate classification for the current time step; and incrementing the current time step.

* * * * *